United States Patent
Carsello et al.

(10) Patent No.: US 11,128,398 B2
(45) Date of Patent: Sep. 21, 2021

(54) BLIND DECODING OF DATA PACKETS

(71) Applicant: SR Technologies, Inc., Sunrise, FL (US)

(72) Inventors: Stephen R. Carsello, Plantation, FL (US); Frank Earl, Ft. Lauderdale, FL (US)

(73) Assignee: SR Technologies, Inc., Sunrise, FL (US)

(*) Notice: Subject to any disclaimer, the term of this patent is extended or adjusted under 35 U.S.C. 154(b) by 105 days.

(21) Appl. No.: 16/592,874

(22) Filed: Oct. 4, 2019

(65) Prior Publication Data

US 2020/0112395 A1 Apr. 9, 2020

Related U.S. Application Data

(60) Provisional application No. 62/741,863, filed on Oct. 5, 2018.

(51) Int. Cl.
*H04L 1/00* (2006.01)
*H04L 29/06* (2006.01)
*H04L 29/08* (2006.01)

(52) U.S. Cl.
CPC ............ *H04L 1/0046* (2013.01); *H04L 69/22* (2013.01); *H04L 69/326* (2013.01)

(58) Field of Classification Search
None
See application file for complete search history.

(56) References Cited

U.S. PATENT DOCUMENTS

2003/0043947 A1* 3/2003 Zehavi ................. H04B 1/7156 375/365
2004/0028083 A1* 2/2004 Billhartz .............. H04B 1/7156 370/503

(Continued)

OTHER PUBLICATIONS

Bluetooth Core Package Version 5.0 Dec. 6, 2016 Downloaded from https://www.mouser.it/pdfdocs/bluetooth-Core-v50.pdf p. 425-427 packet types tables (Year: 2016).*

(Continued)

*Primary Examiner* — Jeffrey M Rutkowski
*Assistant Examiner* — Basil Ma
(74) *Attorney, Agent, or Firm* — Christopher & Weisberg, P.A.

(57) ABSTRACT

A method and system are disclosed for blind decoding of Bluetooth packets. According to one aspect, a method of decoding packets includes detecting a packet using blind LAP detection. The method also includes estimating a duration of a payload of the packet and decoding a payload of the packet over the estimated duration according to each of a plurality of forward error correction (FEC) coding rates to produce a packet header. For each of a plurality of de-whitening seeds, the method includes performing de-whitening, extraction and reverse decoding on the packet header to produce a plurality of candidate upper address parts (UAPs). The method includes obtaining a subset of the candidate UAPs, each candidate UAP having a corresponding CRC code, and forming an ordered list of candidate packet types based at least in part on the estimated duration. The method includes performing a CRC to select a UAP.

20 Claims, 28 Drawing Sheets

(56) References Cited

U.S. PATENT DOCUMENTS

2020/0067633 A1* 2/2020 Carsello ................. H04B 7/26
2020/0273326 A1* 8/2020 Shotton ................. H04W 4/80

OTHER PUBLICATIONS

Eladawy, Ahmed PhD Thesis Texas A&M "Bluetooth/WLAN Receiver Design Methodology and IC Implementations" Dec. 2003. Downloaded from https://citeseerx.ist.psu.edu/viewdoc/download?doi=10.1.1.92.2517&rep=rep1&type=pdf (Year: 2003).*

Ossmann, Michael. Project Ubertooth "Discovering the Bluetooth UAP" Archived Jul. 4, 2015 from http://ubertooth.blogspot.com/2014/06/discovering-bluetooth-uap.html. (Year: 2015).*

* cited by examiner

FIG. 7

| Segment | TYPE code b3b2b1b0 | Slot occupancy | SCO logical transport (1 Mb/s) | eSCO logical transport (1 Mb/s) | eSCO logical transport (2-3 Mb/s) | ACL logical transport (1 Mb/s) ptt=0 | ACL logical transport (2-3 Mb/s) ptt=1 | CSB logical transport (1 Mb/s) | CSB logical transport (2-3 Mb/s) |
|---|---|---|---|---|---|---|---|---|---|
| 1 | 0000 | 1 | NULL | NULL | NULL | NULL | NULL | NULL | NULL |
| 1 | 0001 | 1 | POLL | POLL | POLL | POLL | POLL | — | — |
| 1 | 0010 | 1 | FHS | — | — | FHS | FHS | — | — |
| 1 | 0011 | 1 | DM1 | — | — | DM1 | DM1 | DM1 | DM1 |
| 2 | 0100 | 1 | — | — | — | DH1 | 2-DH1 | DH1 | 2-DH1 |
| 2 | 0101 | 1 | HV1 | — | 2-EV3 | — | — | — | — |
| 2 | 0110 | 1 | HV2 | — | 3-EV3 | — | — | — | — |
| 2 | 0111 | 1 | HV3 | EV3 | — | — | — | — | — |
| 2 | 1000 | 1 | DV | — | — | — | 3-DH1 | — | 3-DH1 |
| 2 | 1001 | 1 | — | — | — | AUX1 | AUX1 | — | — |
| 3 | 1010 | 3 | — | — | 2-EV5 | DM3 | 2-DH3 | DM3 | 2-DH3 |
| 3 | 1011 | 3 | — | — | 3-EV5 | DH3 | 3-DH3 | DH3 | 3-DH3 |
| 3 | 1100 | 3 | — | EV4 | 2-EV5 | — | — | — | — |
| 3 | 1101 | 3 | — | EV5 | 3-EV5 | — | — | — | — |
| 4 | 1110 | 5 | — | — | — | DM5 | 2-DH5 | DM5 | 2-DH5 |
| 4 | 1111 | 5 | — | — | — | DH5 | 3-DH5 | DH5 | 3-DH5 |

*Packets defined for synchronous, asynchronous, and CSB logical transport types*

Bit Stream Processing for Classic Bluetooth Packet Header

Bit Stream Processing for Classic Bluetooth Payload

Illustration of Packet Types for Classic Bluetooth

*FIG. 11*

Packet Length Ranges for Classic Bluetooth — 1100

| Packet Type | Slot Occupancy | Packet Duration (µs) | | |
|---|---|---|---|---|
| | | Minimum (Spec) | Minimum (Expected) | Maximum |
| ID | 1 | 68 | 68 | 68 |
| NULL | 1 | 126 | 126 | 126 |
| POLL | 1 | 126 | 126 | 126 |
| FHS | 1 | 366 | 366 | 366 |
| DM1 | 1 | 171 | 171 | 426 |
| DH1 | 1 | 150 | 150 | 398 |
| 2-DH1 | 1 | 160 | 160 | 392 |
| HV1 | 1 | 366 | 366 | 366 |
| HV2 | 1 | 366 | 366 | 366 |
| 2-EV3 | 1 | 156 | 156 | 392 |
| HV3 | 1 | 366 | 366 | 366 |
| EV3 | 1 | 150 | 150 | 382 |
| 3-EV3 | 1 | 152 | 152 | 390 |
| DV | 1 | 251 | 251 | 356 |
| 3-DH1 | 1 | 155 | 155 | 387 |
| AUX1 | 1 | 134 | 134 | 366 |
| DM3 | 3 | 186 | 441 | 1686 |
| 2-DH3 | 3 | 160 | 428 | 1644 |
| DH3 | 3 | 158 | 430 | 1654 |
| 3-DH3 | 3 | 155 | 427 | 1638 |
| EV4 | 3 | 171 | 441 | 1596 |
| 2-EV5 | 3 | 156 | 428 | 1592 |
| EV5 | 3 | 150 | 430 | 1582 |
| 3-EV5 | 3 | 152 | 427 | 1590 |
| DM5 | 5 | 186 | 1686 | 2916 |
| 2-DH5 | 5 | 160 | 1680 | 2892 |
| DH5 | 5 | 158 | 1678 | 2902 |
| 3-DH5 | 5 | 155 | 1678 | 2888 |

Signal Processing Line-Up for Limiter-Discriminator Receiver

Illustration of Packet Length Estimation for FHS Packet at
$E_s/N_o = 12$ dB

LD-Based Packet Header Error Rate Performance with Ideal Synchronization

FIG. 15

Probability of Falsely Classifying Random Data as FEC Rate 1/3 or 2/3

1500

| $\eta$ | Rate 1/3 | Rate 2/3 | | | |
|---|---|---|---|---|---|
| | n = 80 | n = 4 | n = 8 | n = 12 | n = 16 |
| 0.0625 | 0.9999977 | 0.1192617 | 0.2243001 | 0.3168114 | 0.3982897 |
| 0.1250 | 0.9981607 | 0.1192617 | 0.2243001 | 0.0523514 | 0.0877295 |
| 0.1875 | 0.9260137 | 0.1192617 | 0.0241195 | 0.0054310 | 0.0125940 |
| 0.2500 | 0.5428362 | 0.1192617 | 0.0241195 | 0.0054310 | 0.0012833 |
| 0.3125 | 0.1238525 | 0.0056181 | 0.0015185 | 0.0003858 | 0.0000975 |
| 0.3750 | 0.0089397 | 0.0056181 | 0.0015185 | 0.0000196 | $5.69 \cdot 10^{-5}$ |
| 0.4375 | 0.0001964 | 0.0056181 | 0.0000603 | $7.31 \cdot 10^{-7}$ | $2.60 \cdot 10^{-7}$ |
| 0.5000 | $1.31 \cdot 10^{-6}$ | 0.0056181 | 0.0000603 | $7.31 \cdot 10^{-7}$ | $9.35 \cdot 10^{-8}$ |
| 0.5625 | $2.64 \cdot 10^{-9}$ | 0.0001192 | $1.54 \cdot 10^{-6}$ | $2.01 \cdot 10^{-8}$ | $2.66 \cdot 10^{-10}$ |
| 0.6250 | $1.55 \cdot 10^{-12}$ | 0.0001192 | $1.54 \cdot 10^{-6}$ | $4.02 \cdot 10^{-10}$ | $5.98 \cdot 10^{-12}$ |
| 0.6875 | $2.47 \cdot 10^{-16}$ | 0.0001192 | $1.47 \cdot 10^{-8}$ | $5.74 \cdot 10^{-12}$ | $1.05 \cdot 10^{-13}$ |
| 0.7500 | $9.46 \cdot 10^{-21}$ | 0.0001192 | $1.47 \cdot 10^{-8}$ | $5.74 \cdot 10^{-12}$ | $1.40 \cdot 10^{-15}$ |

| PHTF | Packet Type | Access Code, Packet Header and Voice bits, $n_o$ | Payload Header, bits | CRC, bits | Payload Header and CRC bytes, $m_o$ | Total Payload Bytes $m_{u,min}$ | Total Payload Bytes $m_{u,max}$ | FEC |
|---|---|---|---|---|---|---|---|---|
| 0000 | NULL | 126 | | | 0 | 0 | 0 | |
| 0001 | POLL | 126 | | | 0 | 0 | 0 | |
| 0010 | FHS | 126 | | 16 | 2 | 30 | 30 | 2/3 |
| 0011 | DM1 | 126 | 8 | 16 | 3 | 3 | 36 | 2/3 |
| 0100 | DH1 | 126 | 8 | | 1 | 0 | 32 | |
| 0100 | 2-DH1 | 126 | 8 | 16 | 3 | 2 | 34 | |
| 0101 | HV1 | 126 | | | 0 | 30 | 30 | 1/3 |
| 0101 | HV2 | 126 | | | 0 | 30 | 30 | 2/3 |
| 0110 | 2-EV3 | 126 | | | 0 | 1 | 60 | |
| 0110 | HV3 | 126 | | 16 | 2 | 32 | 32 | |
| 0111 | EV3 | 126 | | 16 | 2 | 3 | 32 | |
| 0111 | 3-EV3 | 126 | | 16 | 2 | 3 | 2 | |
| 1000 | DV | 206 | 8 | 16 | 3 | 0 | 10 | 2/3 |
| 1000 | 3-DH1 | 126 | 16 | 16 | 4 | 0 | 83 | |
| 1001 | AUX1 | 126 | 8 | | 1 | 0 | 29 | |
| 1010 | DM3 | 126 | 16 | 16 | 4 | 0 | 121 | 2/3 |
| 1010 | 2-DH3 | 126 | 16 | 16 | 4 | 0 | 367 | |
| 1011 | DH3 | 126 | 16 | 16 | 4 | 0 | 183 | |
| 1011 | 3-DH3 | 126 | | 16 | 4 | 0 | 553 | |
| 1100 | EV4 | 126 | | 16 | 2 | 1 | 120 | 2/3 |
| 1100 | 2-EV5 | 126 | | 16 | 2 | 1 | 360 | 2/3 |
| 1101 | EV5 | 126 | | 16 | 2 | 1 | 120 | |
| 1101 | 3-EV5 | 126 | 16 | 16 | 2 | 1 | 540 | |
| 1110 | DM5 | 126 | 16 | 16 | 4 | 0 | 224 | 2/3 |
| 1110 | 2-DH5 | 126 | 16 | 16 | 4 | 0 | 670 | |
| 1111 | DH5 | 126 | 16 | 16 | 4 | 0 | 339 | |
| 1111 | 3-DH5 | 126 | 16 | 16 | 4 | 0 | 1021 | |

FIG. 19

| PHTF | Packet Type | Access Code, bits | Packet Header, bits | Payload Header, bits | Payload, bits Min | Payload, bits Max | AES-CCM MIC, bits | FEC | CRC, bits | Total Payload, bits Min | Total Payload, bits Max | Payload Modulation |
|---|---|---|---|---|---|---|---|---|---|---|---|---|
| 0000 | NULL | 72 | 54 | | | | | | | 0 | 0 | GFSK |
| 0001 | POLL | 72 | 54 | | | | | | | 0 | 0 | GFSK |
| 0010 | FHS | 72 | 54 | | 144 | 144 | | 2/3 | 16 | 240 | 240 | GFSK |
| 0011 | DM1 | 72 | 54 | 8 | 0 | 144 | 32 | 2/3 | 16 | 24 | 288 | GFSK |
| 0100 | DH1 | 72 | 54 | 8 | 0 | 224 | 32 | | 16 | 0 | 256 | GFSK |
| 0100 | 2-DH1 | 72 | 54 | 8 | 0 | 224 | 32 | | 16 | 16 | 272 | π/4-DQPSK |
| 0101 | HV1 | 72 | 54 | | 80 | 80 | | 1/3 | | 240 | 240 | GFSK |
| 0101 | HV2 | 72 | 54 | | 160 | 160 | | 2/3 | | 240 | 240 | GFSK |
| 0110 | 2-EV3 | 72 | 54 | 8 | 8 | 480 | | | | 8 | 480 | π/4-DQPSK |
| 0110 | HV3 | 72 | 54 | | 240 | 240 | | | | 256 | 256 | GFSK |
| 0111 | EV3 | 72 | 54 | 8 | 8 | 240 | | | 16 | 24 | 256 | GFSK |
| 0111 | 3-EV3 | 72 | 54 | 8 | 8 | 240 | | | 16 | 24 | 16 | 8-PSK |
| 1000 | 3-DH1 | 72 | 54 | 16 | 0 | 664 | 32 | | 16 | 16 | 712 | 8-PSK |
| 1001 | AUX1 | 72 | 54 | 8 | 0 | 232 | | | | 0 | 232 | GFSK |
| 1010 | DM3 | 72 | 54 | 16 | 0 | 968 | 32 | 2/3 | 16 | 24 | 1524 | GFSK |
| 1010 | 2-DH3 | 72 | 54 | 16 | 0 | 2936 | 32 | | 16 | 16 | 2984 | π/4-DQPSK |
| 1011 | DH3 | 72 | 54 | 16 | 0 | 1464 | 32 | | 16 | 16 | 1512 | GFSK |
| 1011 | 3-DH3 | 72 | 54 | 16 | 0 | 4424 | 32 | | 16 | 16 | 4472 | 8-PSK |
| 1100 | EV4 | 72 | 54 | | 8 | 960 | | 2/3 | 16 | 36 | 1464 | GFSK |
| 1100 | 2-EV5 | 72 | 54 | | 8 | 2880 | | 2/3 | 16 | 36 | 4344 | π/4-DQPSK |
| 1101 | EV5 | 72 | 54 | | 8 | 960 | | | 16 | 24 | 976 | GFSK |
| 1101 | 3-EV5 | 72 | 54 | | 0 | 4320 | | | 16 | 24 | 4336 | 8-PSK |
| 1110 | DM5 | 72 | 54 | 16 | 0 | 1792 | 32 | 2/3 | 16 | 24 | 2760 | GFSK |
| 1110 | 2-DH5 | 72 | 54 | 16 | 0 | 5360 | 32 | | 16 | 16 | 5408 | π/4-DQPSK |
| 1111 | DH5 | 72 | 54 | 16 | 0 | 2712 | 32 | | 16 | 16 | 2760 | GFSK |
| 1111 | 3-DH5 | 72 | 54 | 16 | 0 | 8168 | 32 | | 16 | 16 | 8216 | 8-PSK |

| PHTF | Packet Type | Access Code, bits | Packet Header, bits | Voice bits | Payload Header, bits | Payload Data Bits Min | Payload Data Bits Max | FEC, data only | CRC, bits | Total Payload, bits Min | Total Payload, bits Max | Payload Modulation |
|---|---|---|---|---|---|---|---|---|---|---|---|---|
| 1000 | DV | 72 | 54 | 80 | 8 | 0 | 80 | 2/3 | 16 | 24 | 104 | GFSK |

BLIND DECODING OF DATA PACKETS

CROSS-REFERENCE TO RELATED APPLICATIONS

This application claims priority to U.S. Provisional Application No. 62/741,863, filed Oct. 5, 2018, entitled "BLIND DECODING OF DATA PACKETS", the entirety of which is incorporated herein by reference.

TECHNICAL FIELD

The present disclosure relates to wireless communications and in particular to a method and system for classifying Classic Bluetooth packets and determining the most likely upper address parts (UAPs) and packet data units (PDUs), with no a priori knowledge of the piconets from which they emerge, and with no a priori knowledge of the Bluetooth Device Addresses (BD_ADDRs) associated with any devices.

BACKGROUND

The Bluetooth system is specified in "Specification of the Bluetooth® System, Covered Core Package Version: 5.0, Publication Date: Dec. 6, 2016". Bluetooth operation is in the unlicensed Industrial, Scientific, and Medical (ISM) band from 2.400 to 2.4835 GHz. Classic Bluetooth Basic Rate (BR) and Bluetooth Low Energy (BLE) employ Gaussian Frequency-Shift Keying (GFSK) as the primary modulation scheme, while Classic Bluetooth Enhanced Data Rate (EDR) incorporates differential phase-shift keying (DPSK) for increased throughput as compared with BR. Classic Bluetooth (BR) may occupy any of 79 radio frequency (RF) channels, spaced by 1 MHz, whereas BLE is limited to 40 RF channels, spaced by 2 MHz. For both BR and BLE, the nominal channel symbol rate is 1 MHz, with a nominal channel symbol duration of 1 µs (microsecond).

A more complete understanding of the present embodiments, and the attendant advantages and features thereof, will be more readily understood by first describing relevant Bluetooth system details. Relevant details of the Bluetooth system are therefore presented herein. A more complete description can be obtained by reference to the Specification of the Bluetooth® System.

Bluetooth is a time division multiplex (TDM) system that includes a "Master" device, which initiates an exchange of data, and a "Slave" device which responds to the Master. The time division multiple access (TDMA) slot duration is 625 µs, and the maximum payload length is such that certain packet types may extend up to five slots in length. Each device hops to an RF channel once per packet and Slave devices will utilize the timing of their Master to hop in synchronization. Hopping is based on a defined pseudo random sequence based upon the device address of the Master.

FIG. 1 is a diagram that shows the format of the unique Bluetooth Device Address (BD_ADDR) 100. The BD_ADDR is split into three parts, lower address part (LAP) 110, upper address part (UAP) 120, and non-significant address part (NAP) 130.

FIG. 2 is a diagram that shows the general format 200 for the Classic Bluetooth BR packet type, which start with a Gaussian frequency shift keying (GFSK) Access Code 210. If a packet header follows, the access code is 72 bits long, otherwise the access code is 68 bits long and is known as a shortened access code. For any packet not comprised, solely, of a shortened Access Code, the Access Code 210 is followed by a 54-bit GFSK Packet Header 220, which is generated by encoding an 18-bit information field using a rate 1/3 repetition code. The Header 220 is followed by the payload 230

FIG. 3 is a diagram that shows the general format 300 for packets carrying an enhanced data rate (EDR) payload which start with a GFSK Access Code 210 of length 72 bits, or 68 bits. The Access Code 210 is followed by a 54-bit GFSK Packet Header 220. The GFSK Packet Header 220 is followed by a guard interval 330, of nominal duration 5 µs, followed by an a priori 11-symbol EDR sync word 340, the differential phase shift keying (DPSK) payload 350, and then, finally, two trailer symbols 360.

FIG. 4 is a diagram showing the GFSK Access Code 210, which begins with a 4-bit preamble 410 (either 0101 or 1010), and, for non-shortened Access Codes, ends with a 4-bit trailer 430 (also either 0101 or 1010).

FIG. 5 is a diagram showing the construction 500 of a 64-bit sync word 420. The detailed description for this construction is known and can be found, for example, in Clause 6.3.3.1 of the Specification of the Bluetooth® System 5.0. The sync word 420 generation begins at step 510 or 515 where a 6-bit Barker code is appended to the 24-bit Lower Address Part (LAP) field 110 to form an information sequence. If the MSB of the LAP is a zero 510, then the Barker code 001101 is used. If the MSB of the LAP is a one 515, then the Barker code 110010 is used. Step 510 or 515 is followed by step 520 where the information sequence is pre-scrambled by XORing it with the bits $p_{34} \ldots p_{63}$ of a PN sequence, which has a fixed value, generating data to encode 530. A (64, 30) block code 545 is then appended to generate the codeword 540, the complete PN sequence is XORed to the codeword 540. This step de-scrambles the information part of the codeword 540 and at the same time the parity bits of the codeword are scrambled. Consequently, the original LAP 110 and Barker sequence are ensured a role as part of the access code sync word, and the cyclic properties of the underlying code is removed.

FIG. 6 is a diagram showing the format of the Packet Header 220. In one embodiment, the Header 220 includes six fields: LT_ADDR 610, TYPE 620, FLOW 630, ARQN 640, SEQN 650, and HEC 660. The 3-bit LT_ADDR field 610 contains the logical transport address for the packet. The 4-bit packet header type field (PHTF) 620 specifies which packet type is used. The Flow bit 630 is used for the flow control of packets. The 1-bit acknowledgment indication ARQN 640 is used to inform the source of a successful transfer of payload data with cyclic redundancy check (CRC), and can be positive acknowledge ACK or negative acknowledge NAK. The SEQN bit 650 provides a sequential numbering scheme to order the data packet stream. The HEC 660 is an 8-bit word. Before generating the HEC, the HEC generator is initialized with an 8-bit value. For FHS packets sent in master response substate, the slave upper address part (UAP) is used. For frequency hop synchronization (FHS) packets and extended inquiry response packets sent in inquiry response, the default check initialization (DCI) is used. In all other cases, the UAP of the master device is used.

To indicate the different packets on a logical transport, the 4-bit TYPE code may be used. The packet types are divided into four segments. The first segment is reserved for control packets. All control packets occupy a single time slot. The second segment is reserved for packets occupying a single time slot. The third segment is reserved for packets occupying three time slots. The fourth segment is reserved for packets occupying five time slots. The slot occupancy is reflected in the segmentation and can directly be derived from the type code.

The packet types used on the Bluetooth piconet are known and are described, for example, in Clause 6.5 of the Specification of the Bluetooth® System 5.0. The packets used on the piconet are related to the logical transports on which they are used. Four logical transports with distinct packet types are defined:

synchronous connection-orientated (SCO) logical transport;

enhanced synchronous connection-orientated (eSCO) logical transport;

asynchronous connection-less (ACL) logical transport; and connectionless slave broadcast (CSB) logical transport.

FIG. 7 is a reproduction 700 of Table 6.2 from the Specification of the Bluetooth® System 5.0 and summarizes the packets defined for the SCO, eSCO, ACL, and CSB logical transport types; a dash means the value is reserved for future use. The first column 710 lists the four segments as described above, and the second column 720 provides the sixteen 4 bit TYPE codes corresponding to the TYPE field 620.

FIG. 8 is a block diagram showing an example of bit stream processing 800 for encoding the 54-bit Classic Bluetooth Packet Header. A 10-bit message, which includes a 4-bit Packet Header Type Field (PHTF), is first augmented with an 8-bit Header Error Check (HEC) in block 810. For packets associated with a specific master or slave, the HEC is generated using the 8-bit Upper Address Part (UAP) of the BD_ADDR for either the master or slave device, otherwise, a Default Check Initialization (DCI) is used. The 18-bit information bit field is then whitened using an a priori pseudorandom sequence in block 820, based upon the 8-bit UAP. Hence the whitening starts at one of 64 possible starting locations or "seeds". The 18-bit, whitened information bit sequence is then encoded in block 830 using rate 1/3 repetition coding, resulting in the 54-bit Packet Header, which is modulated as GFSK.

FIG. 9 is a block diagram showing the bit stream processing 900 for a Classic Bluetooth payload, for which some packet types support two different forms of encryption: CRC 910 and E0 Encryption 920, and AES encryption 930 with CRC 940. For packet types which include a cyclic redundancy check (CRC) 910, the first Encryption Type E0 920 obscures the CRC which cannot be used for the checking of valid packets. For packet types employing the encryption type AES 930, a 32-bit Message Integrity Check (MIC) field is first appended to the user payload, and then encryption is performed prior to encoding the CRC 940. In this case the CRC is unobscured, and, therefore, useful for checking for valid packets. The payload, which includes the MIC and the CRC, is then whitened 950 using the same seed that was used for the packet header, but advanced by 18 positions. The whitened information payload is encoded using forward error correction (FEC) 960 of rate 1/3, 2/3, or 1, depending on the packet type, where the rate 1/3 code is the aforementioned repetition code, and the rate 2/3 code is a shortened (15,10) Hamming code.

Blind demodulation and decoding of Classic Bluetooth packets entail synchronizing to packets, and decoding them, with no a priori knowledge of the piconets from which packets emerge, and no a priori knowledge of any specific Bluetooth Device Addresses (BD_ADDRs). As shown in FIGS. 4 and 5, the GFSK Access Code, which serves as a sync word for each packet, is encoded using the 24-bit Lower Address Part (LAP) of the BD_ADDR. Since the LAP is not known a priori, the detector cannot synchronize to a packet using standard techniques which use sync word correlation. Furthermore, once synchronized to a packet, there is no a priori knowledge of the whitening sequence generator's initial state/seed, which can be one of 64 possibilities. Finally, encoding of both the 8-bit Header Error Check (HEC), transmitted during the GFSK Packet Header, and the 16-bit payload CRC, which appears at the end of certain packet types, utilizes the 8-bit Upper Address Part (UAP) of the BD_ADDR, of which, again, the blind decoder has no a priori knowledge.

In the normal case, the Basic Rate (BR) receiver has a priori knowledge of the Access Code 210 and can therefore correlate to the sync word 420 establishing the packet time of arrival and instantaneous offset frequency. When employing a Bluetooth monitoring receiver that is listening for Bluetooth packets on a particular channel, or indeed on all the channels, the LAP 110 is not known and hence the detector cannot synchronize to a packet using standard techniques. Furthermore, once synchronized to a packet, there is no a priori knowledge of the whitening sequence generator's initial state/seed, which can be one of 64 possibilities. Finally, encoding of both the 8-bit Header Error Check (HEC) 660, transmitted during the GFSK Packet Header 220, and the 16-bit payload CRC 840, which appears at the end of certain packet types, utilize the 8-bit Upper Address Part (UAP) 120 of the BD_ADDR 100, of which, again, the blind decoder has no a priori knowledge.

SUMMARY

A method and receiver for the classification of Classic Bluetooth packets and the determination of the most likely UAPs and PDUs, with no a priori knowledge of the piconets from which they emerge, or of the BD_ADDRs associated with any devices, are disclosed.

According to one aspect, a method of decoding packets in a receiver is provided. The method includes detecting a packet using blind LAP detection, the detecting including providing symbol timing estimation and frequency and DC offset correction; estimating a duration of a payload of the packet. The method also includes decoding a packet over the estimated duration according to each of a plurality of forward error correction (FEC) coding rates to produce a packet header and prospective payloads. The method also includes, for each of a plurality of de-whitening seeds, performing de-whitening, extraction and reverse decoding on the packet header to produce a plurality of information fields, one information field for each de-whitening seed, each information field including a candidate upper address part (UAP). The method further includes obtaining a subset of the candidate UAPs, each candidate UAP having a corresponding CRC code. The method includes forming an ordered list of candidate packet types based at least in part on the estimated duration. The method further includes performing a cyclic redundancy check (CRC) on the CRC code in each candidate UAP corresponding to a candidate packet type in the ordered list until a CRC code passes the CRC check. The method also includes selecting a UAP having the CRC code that passes the CRC, and returning a packet data unit (PDU) corresponding to the selected UAP.

According to this aspect, in some embodiments, the blind LAP detection, payload duration estimation, and payload decoding is aided by collision detection. In some embodiments, estimating the payload duration is based at least in part on calculating a first estimate based on a comparison of a look-ahead maximum energy and a running average of received energy, and calculating a second estimate based on subtraction of a first symbol and a factor accounting for a ramp-down of a power amplifier. In some embodiments, the method further includes estimating a modulation index based at least in part on averaging deviations over the packet header, and calculating a signal to noise ratio for the packet header and for the payload of the packet. In some embodiments, the decoding includes classifying an FEC rate as one of 1, 1/3 and 2/3 based on a measured rate of zero syndrome occurrences. In some embodiments, the method further includes creating a table of de-whitening seeds, where for each de-whitening seed there is a corresponding reverse decoded UAP and a packet header type field (PHTF) in the table. In some embodiments, forming the ordered list of candidate packet types includes estimating a packet type based at least in part on packet length, signal to noise ratio (SNR), and elements of FEC rate estimate. In some embodiments the method includes performing a check for packet types based on the estimate, and sorting a remaining set of candidate packets based at least in part on whether modulation is Gaussian frequency shift keying (GFSK), and based at least in part on packet length estimate and estimated FEC rate. In some embodiments, the method further includes for packet types having one of a payload header and a fixed payload length, and for each de-whitening candidate: computing an expected CRC location and performing a CRC of the PDU based on the computed expected CRC location. For variable length packet types with a CRC code but no payload header some embodiments include computing a plurality of estimations of a CRC location based on an estimated payload duration, and performing a CRC for each de-whitening candidate and potential CRC location. In some embodiments, the method also includes, when a packet type has a CRC code, performing a CRC and when the CRC passes, de-whitening the packet using a seed established for the packet type, computing a PDU size based upon a position of the CRC code, and estimating an encryption type. In some embodiments, the method includes, when all seeds have been checked and no valid CRC is found, returning packet information.

According to another aspect, a receiver for blind of decoding packets is provided. The receiver includes processing circuitry configured to detect a packet using blind LAP detection, the detecting including providing symbol timing estimation and frequency and DC offset correction. The processing circuitry is further configured to estimate a duration of a payload of the packet and decode the packet over the estimated duration according to each of a plurality of forward error correction (FEC) coding rates to produce a packet header and prospective payloads. The processing circuitry is further configured to: for each of a plurality of de-whitening seeds, perform de-whitening, extraction and reverse decoding on the packet header to produce a plurality of information fields, one information field for each de-whitening seed, each information field including a candidate upper address part (UAP). The processing circuitry is further configured to obtain a subset of the candidate UAPs, each candidate UAP having a corresponding CRC code. The processing circuitry is further configured to form an ordered list of candidate packet types based at least in part on the estimated duration and perform a cyclic redundancy check (CRC) on the CRC code in each candidate UAP corresponding to a candidate packet type in the ordered list until a CRC code passes the CRC check. The processing circuitry is also configured to select a UAP having the CRC code that passes the CRC, and return a packet data unit (PDU) corresponding to the selected UAP.

According to this aspect, in some embodiments, the blind LAP detection, payload duration estimation, and payload decoding is aided by collision detection. In some embodiments, estimating the payload duration is based at least in part on: calculating a first estimate based on a comparison of a look-ahead maximum energy and a running average of received energy; and calculating a second estimate based on subtraction of a first symbol and a factor accounting for a ramp-down of a power amplifier. In some embodiments, the processing circuitry is further configured to: estimate a modulation index based at least in part on averaging deviations over the packet header; and calculate a signal to noise ratio for the packet header and for the payload of the packet. In some embodiments, the decoding includes classifying an FEC rate as one of 1, 1/3 and 2/3 based on a measured rate of zero syndrome occurrences. In some embodiments, the processing circuitry is further configured to create a table of de-whitening seeds, where for each de-whitening seed there is a corresponding reverse decoded UAP and a packet header type field (PHTF) in the table. In some embodiments, forming the ordered list of candidate packet types comprises: estimating a packet type based at least in part on packet length, signal to noise ratio (SNR), and elements of FEC rate estimate; performing a check for packet types based on the estimate; and sorting a remaining set of candidate packets based at least in part on whether modulation is Gaussian frequency shift keying (GFSK), and based at least in part on packet length estimate and estimated FEC rate. In some embodiments, the processing circuitry is further configured to: for packet types having one of a payload header and a fixed payload length, and for each de-whitening candidate, compute an expected CRC location and perform a CRC of the PDU based on the computed expected CRC location. For variable length packet types with a CRC code but no payload header, in some embodiments, the processing circuitry is further configured to compute a plurality estimations of a CRC location based on an estimated payload duration; and perform a CRC for each de-whitening candidate and potential CRC location. In some embodiments, the processing circuitry is further configured to, when a packet type has a CRC code, perform a CRC and when the CRC passes, the processing circuitry is configured to de-whiten the packet using a seed established for the packet type, compute a PDU size based upon a position of the CRC code, and estimate an encryption type. In some embodiments, the processing circuitry is further configured to, when all seeds have been checked and no valid CRC is found, return packet information.

According to another aspect, a method of decoding packets in a receiver is provided. The method includes determining a lower address part (LAP) of a packet by comparing a portion of the packet to at least one synchronization word. The method also includes decoding a portion of the packet using each of a plurality of de-whitening seeds to produce a plurality of information fields, one information field for each de-whitening seed, each information field including a candidate upper address part (UAP). The method also includes determining a subset of the plurality of information fields, each information field in the subset having a different candidate UAP, each candidate UAP having a corresponding CRC code. The method further includes performing a cyclic redundancy check (CRC) on the CRC code in each candidate UAP, until a CRC code passes the CRC. The method also includes selecting a UAP having the CRC code that passes the CRC, selecting a packet data unit (PDU) corresponding to the selected UAP.

According to this aspect, in some embodiments, the method further includes determining a location of the CRC code within a candidate PDU based on a packet type of the candidate PDU, the candidate PDU corresponding to one of the different candidate UAPs. In some embodiments, the packet type includes packets having at least one of a payload header, a fixed payload length, and a variable length. In some embodiments, the method further includes selecting the packet type from a list of packet types based at least in part on a comparison of a measurement of a signal qualifier over a payload portion of the decoded PDU to a first threshold. In some embodiments, obtaining the list of packet types based at least in part on a length of the decoded PDU. In some embodiments, the sequence of bits is 64 bits long, there are 64 possible de-whitening seeds; and the first set of candidate PDUs has 16 candidate PDUs, each having a 4-bit packet header type field (PHTF) and a corresponding 8-bit UAP occurring in the first set four times. In some embodiments, the decoding includes reverse header error check, HEC, decoding. In some embodiments, the decoding includes application of a Gaussian frequency shift keyed (GFSK) access code serving as a synchronization word for the decoded PDU to the packet. In some embodiments, the GFSK access code is determined by comparing a synchronization word from the LAP to each one of a plurality of sample synchronization words. In some embodiments, the method also includes estimating a length of the packet based at least in part on a running average of received energy over a specifiable number of symbols of the packet.

According to another aspect, a receiver for blind decoding of data packets is provided. The receiver includes processing circuitry configured to determine a lower address part (LAP) of a packet by comparing a portion of the packet to at least one synchronization word. The processing circuitry is also configured to decode a portion of the packet using each of a plurality of de-whitening seeds to produce a plurality of information fields, one information field for each de-whitening seed, each information field including a candidate upper address part (UAP). The processing circuitry is further configured to determine a subset of the plurality of information fields, each information field in the subset having a different candidate UAP, each candidate UAP having a corresponding CRC code. The processing circuitry is also configured to perform a cyclic redundancy check (CRC) on the CRC code in each candidate UAP of an information field in the subset, until a CRC code passes the CRC. The processing circuitry is also configured to select a UAP having the CRC code that passes the CRC and select a packet data unit (PDU) corresponding to the selected UAP.

According to this aspect, in some embodiments, the processing circuitry is further configured to determine a location of the CRC code within a candidate PDU based on a packet type of the candidate PDU, the candidate PDU corresponding to one of the different UAPs. In some embodiments, the processing circuitry is further configured to select the packet type from a list of packet types based at least in part on a comparison of a measurement of a signal qualifier over a payload portion of the decoded PDU to a first threshold. In some embodiments, the processing circuitry is further configured to obtain the list of packet types based at least in part on a length of the decoded PDU. In some embodiments, the sequence of bits is 64 bits long; there are 64 possible de-whitening seeds, and the first set of candidate PDUs has 16 candidate PDUs, each having a 4-bit packet header type field (PHTF) and a corresponding 8-bit UAP occurring in the first set four times. In some embodiments, the decoding includes reverse header error check, HEC, decoding. In some embodiments, the decoding includes application of a Gaussian frequency shift keyed (GFSK) access code serving as a synchronization word for the decoded PDU to the packet. In some embodiments, the GFSK access code is determined by comparing a synchronization word from the LAP to each one of a plurality of sample synchronization words. In some embodiments, the processing circuitry is further configured to estimate a length of the packet based at least in part on a running average of received energy over a specifiable number of symbols of the packet.

According to yet another aspect, a method of decoding data packets in a wireless receiver is provided. The method includes, for each of at least one packet: extracting a sequence of bits of a packet at a location of a lower address part, (LAP) of the packet and comparing at least a portion of the sequence of bits to at least one sample re-encoded synchronization word to determine if an LAP is detected. When an LAP is detected, then for each of a plurality of de-whitening seeds, the method includes decoding at least a part of the packet using the de-whitening seed to produce an information field, each information field having a packet header and a candidate upper address part (UAP) to identify a first set of candidate packet data units (PDUs), each candidate UAP having a corresponding CRC code. Also, when an LAP is detected, the method also includes performing a cyclic redundancy check (CRC) on the CRC code in each candidate PDU of the first set, until a CRC code passes the CRC. Further, when an LAP is detected, the method includes selecting a PDU of the first set as the decoded PDU, the decoded PDU being the PDU having the CRC code that passes the CRC, and outputting the detected LAP, the UAP and the decoded PDU.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a reproduction of the Table of Packets defined for synchronous, asynchronous, and CSB logical transport types

FIG. 11 lists the Bluetooth packet types, as shown in FIGS. 7 and 10, plus the 'special' ID packet;

FIG. 15 is a table of the probability of falsely classifying random data as FEC rate 1/3 or 2/3, versus threshold $\eta$ and number of codewords n;

FIG. 18 is a table of example relevant particulars for the packet types that can be used in relation to equation (27);

FIG. 19 is a table of the physical layer details of each packet type;

DETAILED DESCRIPTION

This disclosure relates to the blind decoding of Bluetooth packets. A method and description of the algorithms is disclosed for the classification of Classic Bluetooth packets and the determination of the most likely UAPs and PDUs, with no a priori knowledge of the piconets from which they emerge, or of the BD_ADDRs associated with any devices.

A goal of a blind demodulator and decoder, for a given RF channel, is to synchronize to in-coming packets, without any a priori knowledge of prospective LAPs, and to inspect their contents, in an attempt to make a best-guess at the packet type so that both the UAP and the Packet Data Unit (PDU) may be extracted and delivered to a higher layer.

Figure 10:
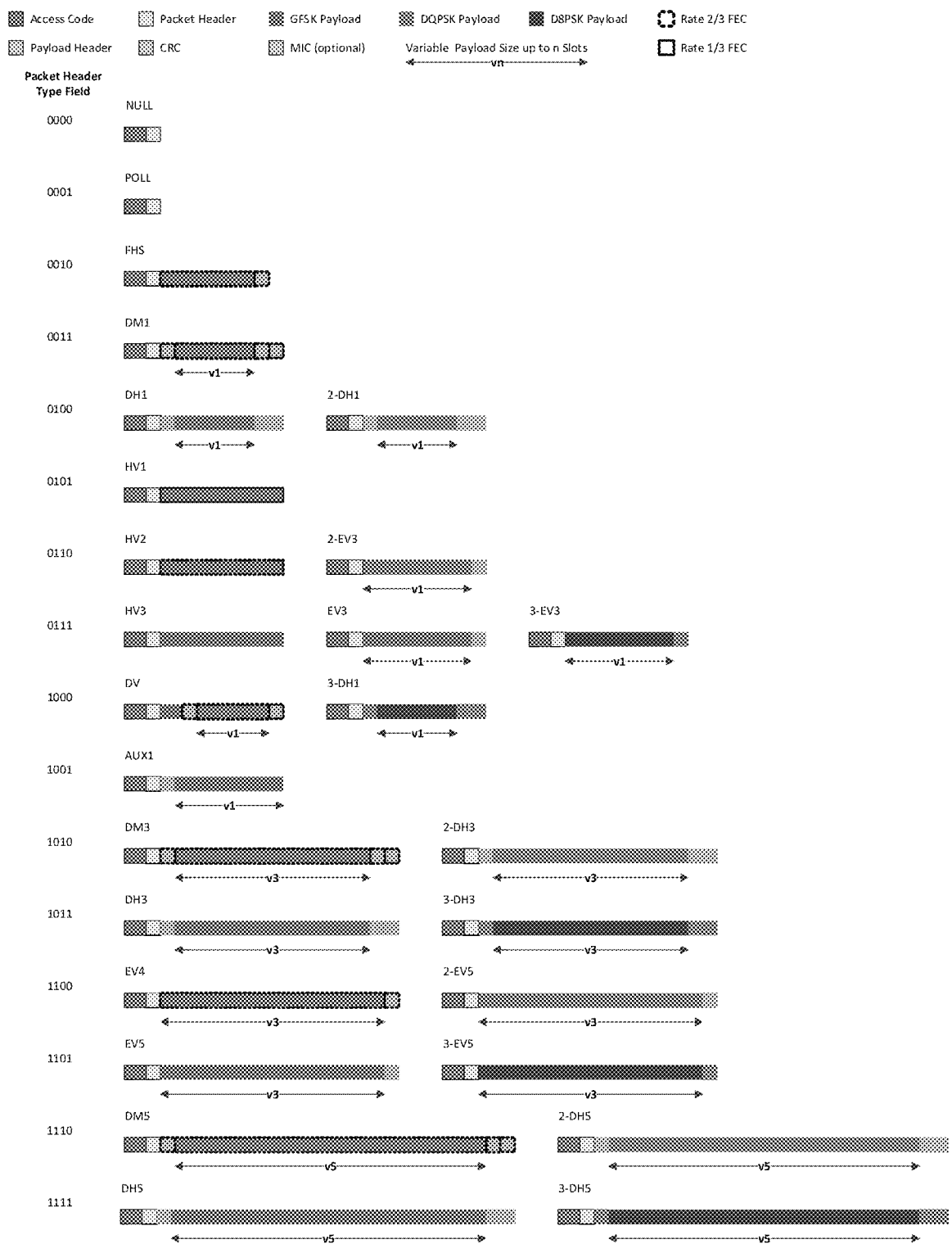
FIG. 10 is an illustration of example properties for all Classic Bluetooth packet types.

FIG. 10 is an illustration of some properties for all Classic Bluetooth packet types. Features of Classic Bluetooth packets, as shown in FIG. 10 (and also in FIG. 19), may include the following:
1. Payload Modulation type: GFSK, DQPSK, or D8PSK
2. Payload FEC coding rate: 1/3, 2/3, or 1
3. Packet Duration: Fixed or Variable
4. Payload Header: 0, 1, or 2 bytes
5. CRC: Present or Not Present
6. MIC: Present or Not Present A blind synchronizer processes a received signal and outputs a stream of length 64 binary vectors. Each prospective block of 64 bits may then be checked for resemblance to a Classic Bluetooth sync word. For example, from each length-64 block, the 24-bit field corresponding to the prospective LAP can be extracted, and then a sync word re-encoding into 64 bits can be performed. In general, if the received 64 bits match the re-encoded 64 bits, an LAP is deemed to be detected, and packet processing may ensue. Bluetooth Blind detection which detects the Access Code and LAP for a Bluetooth packet for which there is no a priori knowledge of the piconet is beyond the scope of this disclosure. In this present disclosure, the ensuing processing steps, from the GFSK Packet Header, through the payload, are described and characterized. The objective is to identify and output the packet type, the UAP and the PDU.

FIG. 11 lists Bluetooth packet types, as shown in FIGS. 7 and 10, plus the 'special' ID packet. An ID packet transmits a shortened, length-68 Access Code, only. The NULL and POLL packets transmit an Access Code and a Packet Header, only. While the Access Code and Packet Header are always transmitted as GFSK, with fixed properties, the structure of the payload may depend on the packet type. The payload modulation type is GFSK for Basic Rate (BR), and either DQPSK or D8PSK for Enhanced Data Rate (EDR). The payload FEC coding rate is 1/3 for the fixed-length, HV1 packet, only, otherwise, the FEC coding rate is either rate 2/3 or un-coded, i.e., rate 1. All EDR payloads may be un-coded.

The packet duration may be either fixed or variable, with fixed-length packets fitting within a single slot such as a single 625 μs slot, and with variable-length packets reserving either one, three, or five slots, each of predetermined duration such as 625 μs. The Specification of the Bluetooth® System allows packet types which reserve multiple slots, to be transmitted with a minimum user payload size that results in a packet occupying less than one slot. When forming the list of candidate packet types, a design option can be enforced in which expected packet types, which reserve multiple slots, may occupy all of the reserved slots. FIG. 11 shows, for each packet type, the slot occupancy, the minimum packet duration according to the Specification of the Bluetooth® System, the minimum expected packet duration based on the slot occupancy, and the maximum packet duration, all in μs (microseconds).

Figure 9:
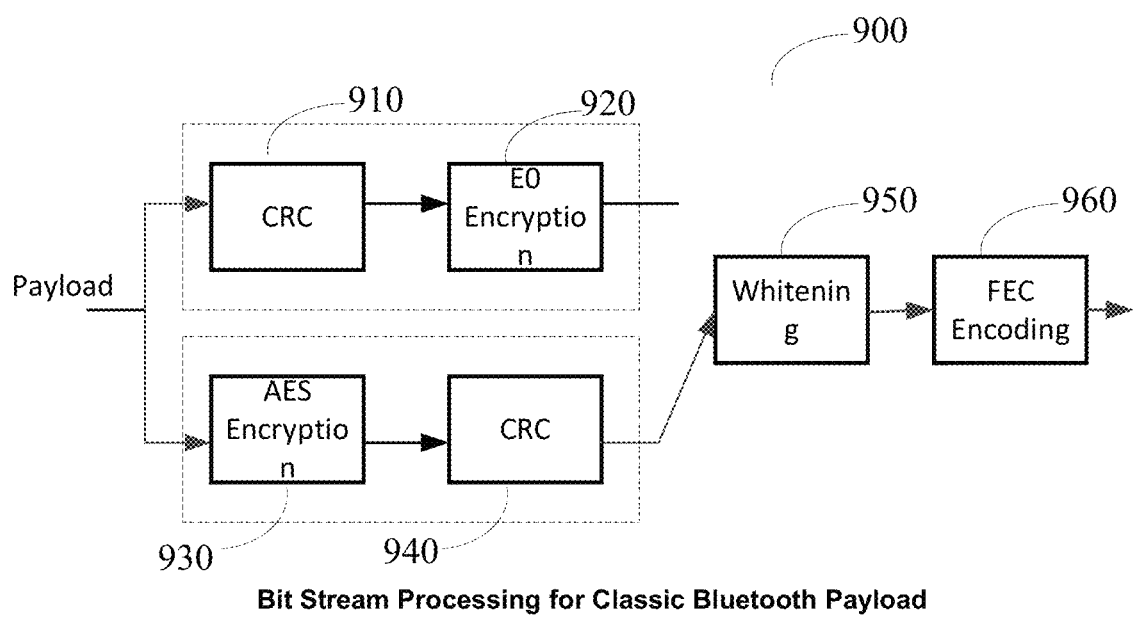
FIG. 9 is a block diagram showing the bit stream processing for a Classic Bluetooth payload, for which some packet types support two different forms of encryption.
Figure 20:
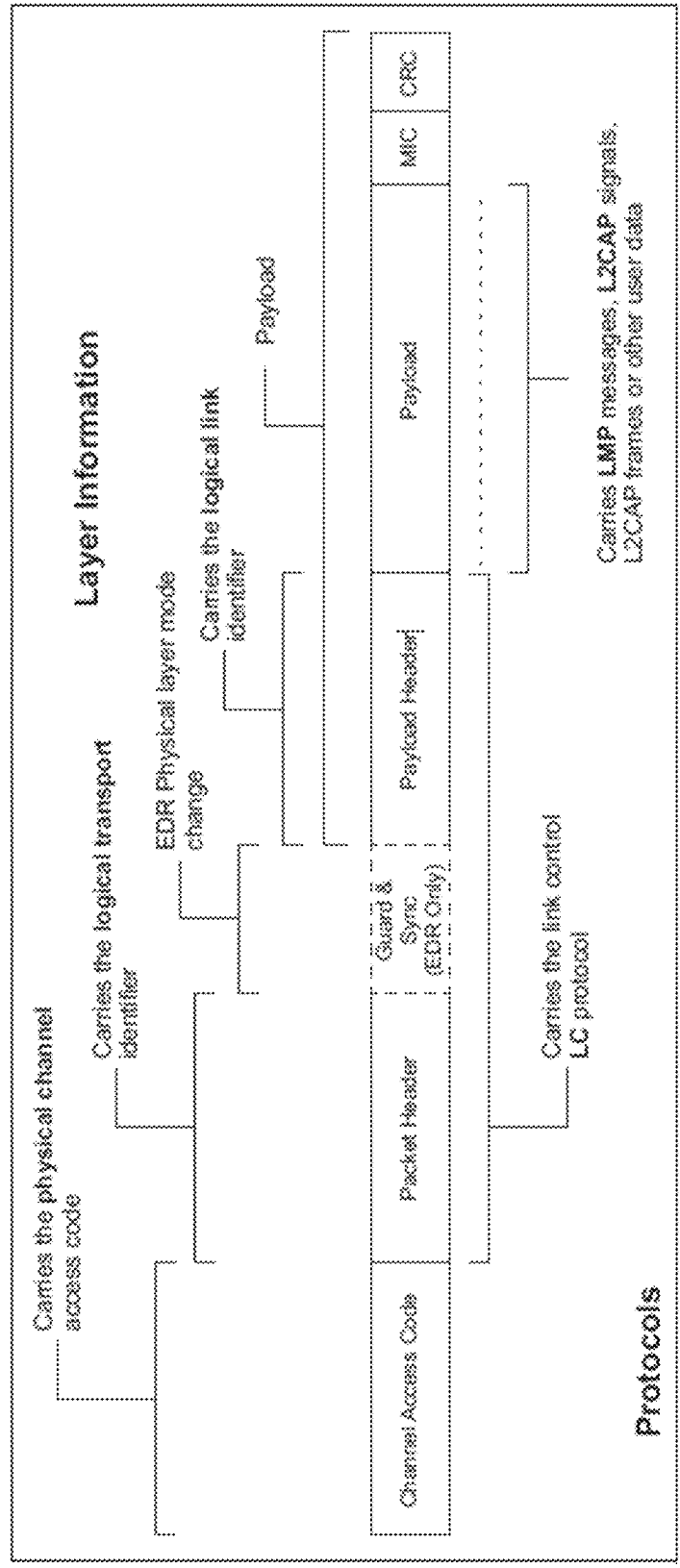
FIG. 20 is a diagram showing the packet structure for packet types with a payload header, MIC and CRC.

As shown in FIG. 10, a subset of the variable-length packet types may include a one or two-byte payload header. A field in the payload header may indicate the size of the user payload. For a subset of the packet types, a 16-bit CRC follows the user payload. For packets which incorporate AES-CCM Encryption 930, as shown in FIG. 9, the encrypted user payload is augmented with a 32-bit Message Integrity Check (MIC), which immediately precedes the CRC 940. An example of a BR/EDR packet structure is shown in FIG. 20. For the purposes of blind decoding, packet types which include a CRC, such as DM and DH packets, can be positively confirmed as the whitening seed can be narrowed down to a single candidate combined with application of the candidate CRC. The FHS packet is of fixed length, with rate 2/3 coding plus a CRC, and a user payload that includes an entire 48-bit BD_ADDR, including the 16-bit Non-Significant Address Part (NAP), and provides very useful information for a blind decoder scheme. This BD_ADDR carried in the FHS payload should not be assumed to be the same BD_ADDR as that used to generate the Access Code, HEC, and payload CRC.

Figure 12:
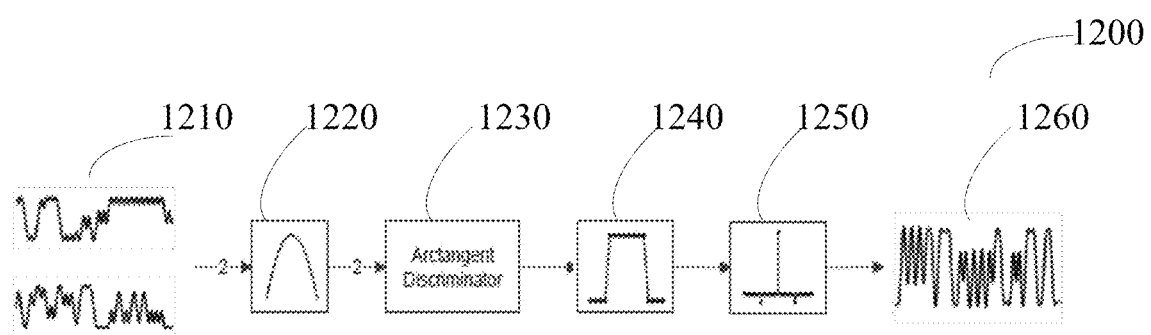
FIG. 12 is a block diagram of an example limiter-discriminator (LD) based detector for GFSK demodulation.

FIG. 12 is a block diagram 1200 of an example limiter-discriminator (LD) based detector for GFSK demodulation. Complex, received samples 1210 are inputted to a receive selectivity filter 1220 which is followed by an arctangent-based discriminator 1230, which computes the modulo-$2\pi$ differential of the instantaneous, four-quadrant angle, with its output normalized by $\pi$. A post-discriminator, integrate-and-dump filter 1240, which removes additional noise, may be followed by a zero-forcing equalizer (ZFE) 1250, which compensates for inter-symbol interference (ISI) introduced by the transmitter and post-discriminator filter. For the purpose of this disclosure, the receive selectivity filter 1220 may be a Gaussian filter with two-sided, 3-dB bandwidth 0.9Rs, where Rs is the symbol rate in symbols per second, and Rs=1/T where T is the nominal symbol duration. The ZFE 1250 is designed such that its response, combined with the post-discriminator, integrate-and-dump filter 1240 response, and the transmitted frequency pulse (t), may form a T-spaced, zero-inter-symbol interference (ISI) channel.

The sample sequence, $\{z_m\}$, at the ZFE output 1250, is at a rate of $N_s$ samples per symbol. Since the arctangent discriminator 1230 is normalized by $\pi$, the units at the LD output 1260 are half-cycles-per-sample. The conversion to frequency, $C_{LD2Hz}$, in Hz, is $$C_{LD2Hz} = \frac{N_s R_s}{2} \quad (1)$$

where Ns=samples per symbol.

In one embodiment, the symbol rate, Rs, is 1,000,000 symbols per second and for 8 samples per symbol, Ns=8, the conversion to frequency, $C_{LD2Hz}$, is 400,000.

For a modulation index h, the frequency shift, $\Delta f$, is $$\Delta f = h \cdot R_s / 2 \quad (2)$$

which corresponds to an output at the LD of $\Delta f / C_{LD2Hz}$ given by:

$$\Delta f / C_{LD2Hz} = 2h \cdot R_s / 2N_s \cdot R_s = h/N_s \quad (3)$$

Hence, the frequency shift of the modulated signal results in an LD output of h/Ns.

For a modulation index, h=0.32, $\Delta f$=160,000 Hz, and for Ns=8 samples per second, the LD output is 0.04. A blind Bluetooth detector can be used to detect the Access Code and LAP for a Bluetooth packet for which there is no a priori knowledge of the piconet as well as to estimate the frequency offset. The frequency offset equates to a DC offset, $\overline{DC}$, at the LD output.

A method is now disclosed for estimating the packet length.

Let $\hat{m}_o$ be the estimated sample time associated with the center of the first preamble symbol of a detected Classic Bluetooth packet. The received energy E(n) for symbol n≥0, observed at the GFSK selectivity filter output, 1220, is $$E(n) = \sum_{m=-\frac{N_s-1}{2}}^{m=+\frac{N_s-1}{2}} |y_{\hat{m}_0 + m + nN_s}|^2 \quad (4)$$

where $\{y_m\}$ is the complex, GFSK selectivity filter 1220 output, and $N_s$ is the number of samples per symbol.

The running average energy $E_{avg}(n)$, over a window of the most recent $N_w$ symbols, is $$E_{avg}(n) = \frac{1}{N_w} \sum_{i=0}^{N_w-1} E(n-i) \quad (5)$$

The running, look ahead, maximum energy $E_{max}(n)$, over a window of the future $N_w$ symbols, is $$E_{max}(n) = \max_{i \in [1, N_w]} [E(n+i)] \quad (6)$$

Figure 13:
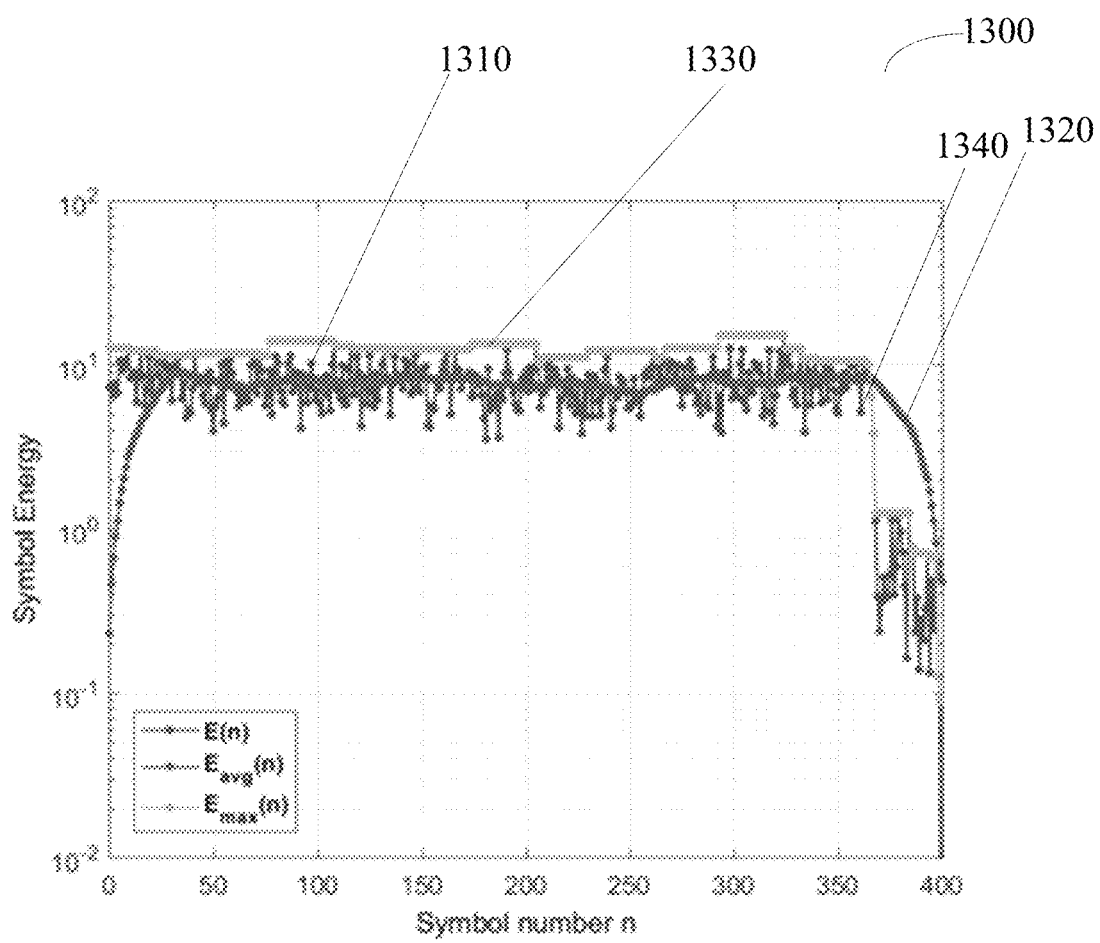
FIG. 13 is an illustration of packet length estimation for an FHS packet.

FIG. 13 is an illustration 1300 of the packet length estimation for an FHS packet where $N_w$=32. The running received energy E(n) 1310 is plotted for every symbol n. The running average received energy $E_{avg}(n)$ 1320 is calculated over the last 32 symbols. At the end of the received packet 1340, the average energy $E_{avg}(n)$, starts to tail off. The running, look ahead, maximum energy $E_{max}(n)$, 1330 is equal to the maximum symbol energy E(n) for the next 32 symbols. At the end of the received packet 1340, the running, look ahead, maximum energy $E_{max}(n)$, 1330 falls off sharply. The end of the packet, and hence the number of symbols n in the packet, can be estimated by measuring the point at which the value of the look-ahead, maximum energy $E_{max}(n)$, 1330 falls below a value of the running average received energy $E_{avg}(n)$, 1320. This point can be defined as follows:

Let $\aleph$ be the set of symbol indices such that the following condition is met, $$\text{then } n \in \aleph \Leftrightarrow E_{max}(n) \leq \eta \cdot E_{avg} \quad (7)$$

The packet length, $\hat{L}$, in symbols, can then be estimated as $$\hat{L} = \min_{n \in \aleph}(n) - n_0 - \Delta \quad (8)$$

where $\Delta$ is a factor used to subtract out the potential ramp-down of a power amplifier. If $\aleph$ is empty, i.e., if the packet never appears to fall off, then the maximum packet length $\hat{L}$=2916 may be assumed. In one implementation of the disclosure, the settings Nw=32, $\eta$=0.625, and $\Delta$=1 are used. It is understood by one skilled in the art that other values may be used and that implementations are not limited solely to the values disclosed herein.

FIG. 13 is based on the output of the Gaussian selectivity filter, 1220, for an FHS packet received at $E_s/N_o$=12 dB. For this example, the packet length is estimated to be $\hat{L}$=366, which matches the actual FHS packet length, as listed in FIG. 11.

In order to discard packets which incur collisions, additional logic may be introduced in the form of the following test. Let $$E_{min}(n) = \min_{i \in [1, N_{w,2}]} [E(n+i)] \quad (9)$$

and let $\aleph_2$ be the set of symbol indices where a rising edge has been detected in the signal envelope, i.e., $$n \in \aleph_2 \Leftrightarrow E_{min}(n) \geq \eta_2 \cdot E_{avg} \quad (10)$$

In order to discard packets where a collision has been detected, the following rule may be applied $$\hat{L} = \begin{cases} 0 & \min_{n \in \aleph_2}(n) < \hat{L} \\ \hat{L} & \text{otherwise} \end{cases} \quad (11)$$

In one implementation of the disclosure, a threshold setting $\eta_2$=1.25 may be used. However, it is noted that implementations are not limited to this threshold setting and that other values may be employed.

The following is an example method for GFSK detection and sync tracking that may be used in some embodiments.

Upon LAP detection, the symbol timing and DC offset, as observed at the ZFE output, 1260 are initialized. The symbol samples, $y_n$, for the 54 Packet Header bits, which immediately follow the 72-bit Access Code, are collected according to:

$$y_n = z_{\hat{m}_0 + (72+n)N_s} \quad (12)$$

for n=0, 1, 2, ..., 53, where $\{z_m\}$ is the ZFE output 1260, $N_s$ is the number of samples per symbol, and $\hat{m}_0$ is the estimated sample time, corresponding to the center of the first preamble symbol of the Access Code.

The deviation of the symbol samples, $y_n$, is related to the modulation index as per equation (3). If there is a frequency offset, then the deviation of the symbol samples, $y_n$, about the DC offset, $\overline{DC}$, at the LD output is related to the modulation index. For the Bluetooth® System, the minimum and maximum modulation index is 0.28 and 0.35, respectively. Hence, the modulation index $\hat{h}$ may be estimated by averaging the deviations over the Packet Header as follows:

$$\hat{h} = \min\left\{\max\left[F \cdot N_s \cdot \frac{1}{54}\sum_{n=0}^{53}|y_n - \overline{DC}|, 0.28\right], 0.35\right\} \quad (13)$$

where F is a factor introduced to remove scalar bias caused by inter symbol interference (ISI). A value for F of 1.05 has been found to yield good results in practice and may be used.

The GFSK Detector and Sync-Tracking blocks work in tandem and are engaged once the symbol timing estimate $\hat{m}_0$, modulation index estimate $\hat{h}$, and DC offset estimate $\overline{DC}$ are available. In addition to hard bits, the Classic Bluetooth detector requires soft bits for the rate 1/3 FEC decoder, as well as a measure of the demodulated SNR during, both, the Packet Header and payload portions of the prospective GFSK packet. Starting with the first symbol of the Packet Header, the GFSK Detector/Sync-Tracker is initialized as follows:

$$n = 0$$

$$m_{0,n} = \hat{m}_0 + 72 N_s$$

$$DC_{track,n} = \overline{DC}$$

$$E_1 = 0 \; E_2 = 0$$

where $E_1$ and $E_2$ are the values of the measured noise during the header and the payload respectively. The soft bit $y_n$ for symbol n may be computed from the deviation of the symbol samples, $y_n$, about the DC offset, $\overline{DC}$, at the LD output, $$y_n = z_{m_{0,n}} - DC_{track,n}$$

and the bit-slicer and sync-tracking blocks perform the following update $$\hat{b}_n = \begin{cases} 1 & y_n > 0 \\ 0 & y_n \leq 0 \end{cases} \quad (14)$$

The variation, or jitter, $e_n$ of the LD output is the difference between the measured value of $y_n$, and the value calculated as per equation (3), which is the nominal value based upon the modulation index, $\hat{h}$.

$$e_n = y_n - \frac{\hat{h}}{N_s}(2\hat{b}_n - 1) \quad (15)$$

In order to track variations, the value of $DC_{track,n}$ can be updated according to $$DC_{track,n+1} = DC_{track,n} + C_{dc} e_n \quad (16)$$

Where $C_{dc}$ is the DC tracking loop gain. A value for $C_{dc}$ of 1/64 has been found to yield good results in practice.

The symbol timing estimate can be updated for the next symbol according to:

$$m_{0,n+1} = m_{0,n} + N_S \quad (17)$$

The values of the measured noise during the header and the payload, $E_1$ and $E_2$, respectively, can be updated according to $$E_1 = E_1 + e_n^2 \text{ for } 0 \leq n \leq 53 \quad (18)$$

$$\text{and } E_2 = E_2 + e_n^2 \text{ for } 54 \leq n \leq \hat{L} - 72 - 2 \quad (19)$$

where $\hat{L}$ is the packet length in symbols as calculated using equation (8). Note that the noise power estimate for the payload portion of the packet can be finalized shortly before the estimated end of the packet, e.g., two symbols prior.

The estimated signal to noise ratios (SNRs) for the Packet Header and GFSK payload portions of the packet can then be calculated as follows:

Packet Header $SNR_1$ (20)

$$SNR_1 = \frac{(\hat{h}/N_s)^2}{E_1/54}$$

Payload $SNR_2$ (21)

$$SNR_2 = \frac{(\hat{h}/N_s)^2}{E_2/(\hat{L} - 126 - 2)}$$

Note that for the modulation of the payload of an EDR packet, DQPSK and D8PSK, the $SNR_2$ value may be very small. By setting a threshold for $SNR_2$, it may be possible to distinguish between BR packets and EDR packets. This will be used later as described below with reference to FIG. 17.

At least the following two methods may be used for decoding the rate 1/3 repetition code associated with the GFSK Packet Header, as well as the HV1 payload. For either method, 3N demodulated bits are partitioned into N 3-tuples.

According to the first method, each of the N bits, $\hat{d}_i^{(1)}$, for i=0, 1, ..., N-1, is decoded based on the majority rule:

$$\hat{d}_i^{(1)} = \begin{cases} 1 & \sum_{p=0}^{2} \hat{b}_{n_0 + 3i + p} \geq 2 \\ 0 & \text{else} \end{cases} \quad (22A)$$

where $n_0$ is the location of the first demodulated bit of the coded signal (relative to the start of the GFSK Packet Header).

According to the second method, each of the N bits, $\hat{d}_i^{(2)}$, for i=0, 1, ..., N-1, is decoded based on combining of the soft bits, $y_n$:

$$\hat{d}_i^{(2)} = \begin{cases} 1 & \sum_{p=0}^{2} y_{n_0+3i+p} > 0 \\ 0 & \text{else} \end{cases} \quad (22B)$$

Figure 14:
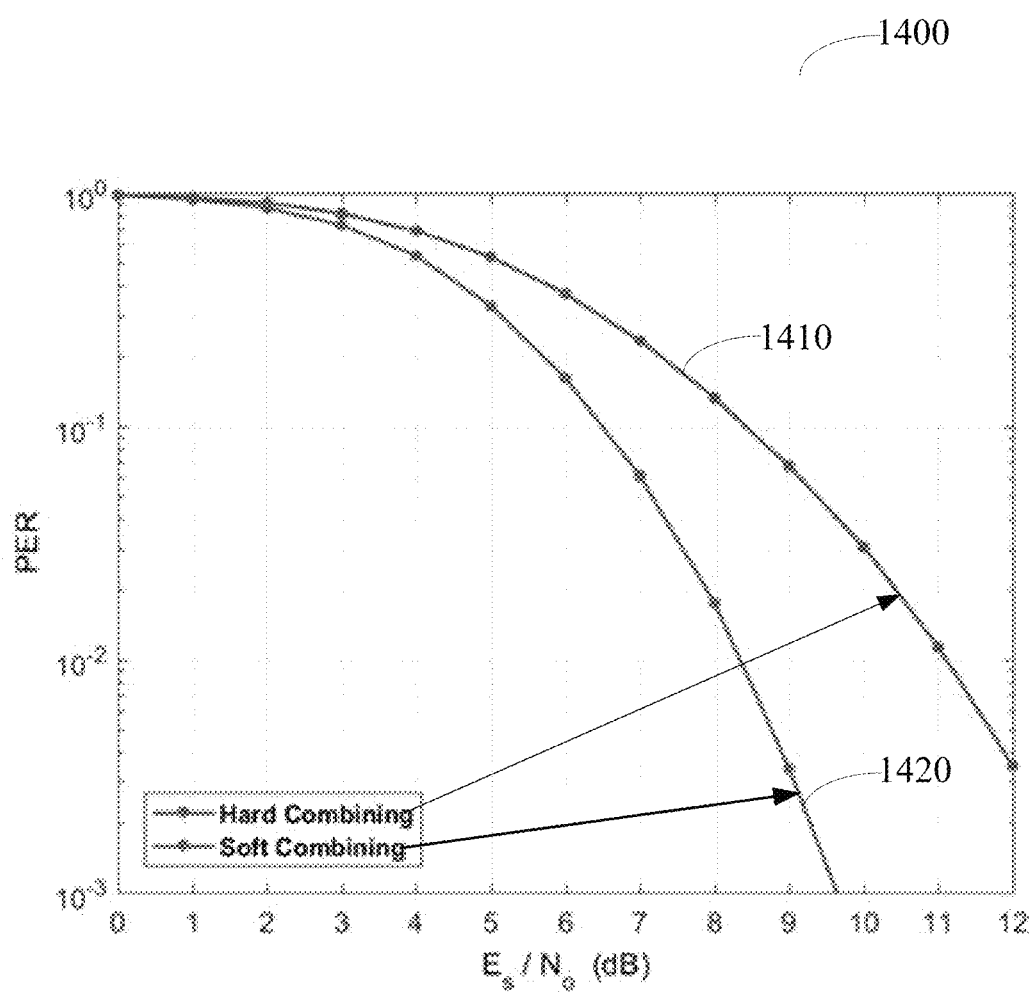
FIG. 14 is a graphical representation of the results of a simulation that compares the GFSK Packet Header Error Rate performance for two methods for packet error rate (PER) versus the energy per bit to noise power spectral density ratio, $(E_b/N_o)$.

FIG. 14 is a graphical representation 1400 of the results of a simulation that compares the GFSK Packet Header Error Rate performance for the two methods as disclosed above for packet error rate (PER) versus the energy per symbol to noise power spectral density ratio, ($E_s/N_o$). The simulation assumes LD detection with ideal synchronization, and an ideal modulator with nominal modulation index h=0.32. The result of the soft-combining method 1420 as per equation (22) provides a significant gain over the result of the majority rule hard decoding 1410, as per equation (21), of nearly 3 dB at the 1% PER point. The soft-combining method as per equation (22) is therefore preferred for decoding the rate 1/3 repetition code.

An example method is now disclosed for the decoding of the FEC coding. Packets with FEC are shown in FIG. 10. The rate 2/3 FEC code is a shortened (15,10) Hamming code, capable of correcting any single-bit-error pattern, using a syndrome-based decoder.

Let $\vec{b}=[b_0\ b_1\ \ldots\ b_{14}]$ be a given 15-tuple of demodulated bits, ordered such that the first 5 bits are the prospective parity bits.

The syndrome $\vec{s}$ is a 5-bit integer, computed, in binary form, as $$\vec{s} = \vec{b}\vec{H} \bmod 2 \quad (23)$$

where $\vec{H}$ is the 15×5 binary matrix shown below, derived from "FEC Sample Data" Specification of the Bluetooth® System, and is set forth below:

TABLE 1

| 15 × 5 H Matrix for (15, 10) Syndrome Decoder | | | | |
|---|---|---|---|---|
| 1 | 0 | 0 | 0 | 0 |
| 0 | 1 | 0 | 0 | 0 |
| 0 | 0 | 1 | 0 | 0 |
| 0 | 0 | 0 | 1 | 0 |
| 0 | 0 | 0 | 0 | 1 |
| 1 | 1 | 0 | 1 | 0 |
| 0 | 1 | 1 | 0 | 1 |
| 1 | 1 | 1 | 0 | 0 |
| 0 | 1 | 1 | 1 | 0 |
| 0 | 0 | 1 | 1 | 1 |
| 1 | 1 | 0 | 0 | 1 |
| 1 | 0 | 1 | 1 | 0 |
| 0 | 1 | 0 | 1 | 1 |
| 1 | 1 | 1 | 1 | 1 |
| 1 | 0 | 1 | 0 | 1 |

The decoded 10-tuple is $$\vec{d} = [d_0\ d_1\ \ldots\ d_9] \quad (24)$$

with $$d_i = b_{5+i} \oplus \vec{E}_{s_0, 5i}$$

for $i = 0, 1, \ldots, 9$, with $\quad (25)$ $$s_0 = \vec{s} \cdot \begin{bmatrix} 16 \\ 8 \\ 4 \\ 2 \\ 1 \end{bmatrix}$$

where $\vec{E}$ is the 32×15 error correction matrix shown below.

TABLE 2

| 32 × 15 E Matrix for (15, 10) Syndrome Decoder | | | | | | | | | | | | | | |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 |
| 0 | 1 | 0 | 0 | 0 | 0 | 0 | 0 | 0 | 0 | 0 | 1 | 0 | 0 | 0 |
| 0 | 0 | 1 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 1 | 0 | 0 | 0 | 0 | 0 | 0 |
| 0 | 1 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 1 | 0 | 0 | 0 | 0 | 0 |
| 1 | 0 | 0 | 0 | 1 | 0 | 0 | 0 | 0 | 0 | 0 | 0 | 0 | 0 | 0 |
| 0 | 0 | 0 | 0 | 0 | 0 | 0 | 0 | 0 | 0 | 1 | 0 | 0 | 0 | 0 |
| 1 | 0 | 0 | 0 | 0 | 0 | 1 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 |
| 1 | 0 | 0 | 0 | 0 | 0 | 0 | 0 | 0 | 0 | 0 | 0 | 1 | 0 | 0 |
| 1 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 |
| 1 | 0 | 0 | 1 | 0 | 0 | 0 | 0 | 0 | 0 | 0 | 0 | 0 | 0 | 0 |
| 1 | 0 | 1 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 1 | 0 | 0 | 0 |
| 1 | 0 | 1 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 1 | 0 | 0 | 0 | 0 |
| 1 | 0 | 0 | 0 | 0 | 0 | 0 | 0 | 1 | 0 | 0 | 0 | 0 | 0 | 0 |
| 1 | 1 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 |
| 0 | 0 | 0 | 0 | 1 | 0 | 0 | 0 | 0 | 0 | 0 | 0 | 0 | 0 | 0 |
| 1 | 0 | 0 | 0 | 0 | 0 | 0 | 0 | 0 | 0 | 1 | 0 | 0 | 0 | 0 |
| 0 | 0 | 0 | 0 | 0 | 0 | 1 | 0 | 0 | 0 | 0 | 0 | 0 | 0 | 0 |
| 1 | 0 | 0 | 0 | 0 | 1 | 0 | 0 | 0 | 0 | 0 | 0 | 0 | 0 | 0 |
| 1 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 1 | 0 | 0 |

Packet types are of various sizes, and use an FEC coding rate of either 1/3, 2/3, or 1, as shown in FIG. 10. In addition to FEC decoding, so as to classify the packet type, the FEC coding rate may be calculated. A method is disclosed that estimates the FEC coding rate by measuring the rate of zero-syndrome occurrences.

For the prospective rate 1/3 code, a zero-syndrome is observed when all demodulated bits of a given 3-tuple are the same, and, for the prospective rate 2/3 code, a zero-syndrome is observed when a given 15-tuple produces zero syndrome, i.e., $s_0=0$.

The probability of falsely classifying the FEC rate may be determined as follows:

Let p be the probability of random data producing a zero syndrome, where $p=2^{-5}$ for rate 2/3 coding, and $p=2^{-2}$ for rate 1/3 repetition coding. For estimation over n codewords, the probability of k occurrences of zero syndrome follows the binomial distribution $$P(k) = \binom{n}{k} p^k (1-p)^{n-k}$$

The more codewords n that are checked, the less the probability of a false classification. The probability $P_f$ of falsely classifying random data as coded data is $$P_f = P(k \geq \eta \cdot n) = \sum_{k=\lceil \eta \cdot n \rceil}^{n} \binom{n}{k} p^k (1-p)^{n-k} \qquad (26)$$

where $\eta$ is a threshold in the range 0 to 1 such that $\lceil \partial \cdot n \rceil$ is the minimum number of codewords required to produce the false probability rate $P_f$.

FIG. 15 is a table of the probability of falsely classifying random data as FEC rate 1/3 or 2/3, versus threshold $\eta$ and number of codewords n. For rate 1/3, the fixed length n=80 associated with the HV1 packet, is used. For the condition 1510 rate 1/3, n=80, threshold $\eta$=0.5000, the false probability rate is at an acceptable level and as such a threshold of $\eta$=0.500 is recommended for classifying FEC rate 1/3.

For the condition 1520 rate 2/3, number of codewords n=16, and threshold $\eta$=0.3750, the false probability rate is at an acceptable level and as such, a threshold of $\eta$=0.3750 to distinguish between rate 2/3 and 1 may be used. In order to estimate the rate 2/3, it is noted that n≥12 codewords should be measured, with a fixed threshold $\eta$=0.375, in some embodiments. Note that the single-slot DV packet, which contains both un-coded voice and rate 2/3 coded data, has a fixed payload of 10 codewords and hence, does not carry enough (15,10) codewords to meet the n≥12 condition. Hence, there may be less confidence in classifying its FEC rate for packet type DV.

Figure 1:
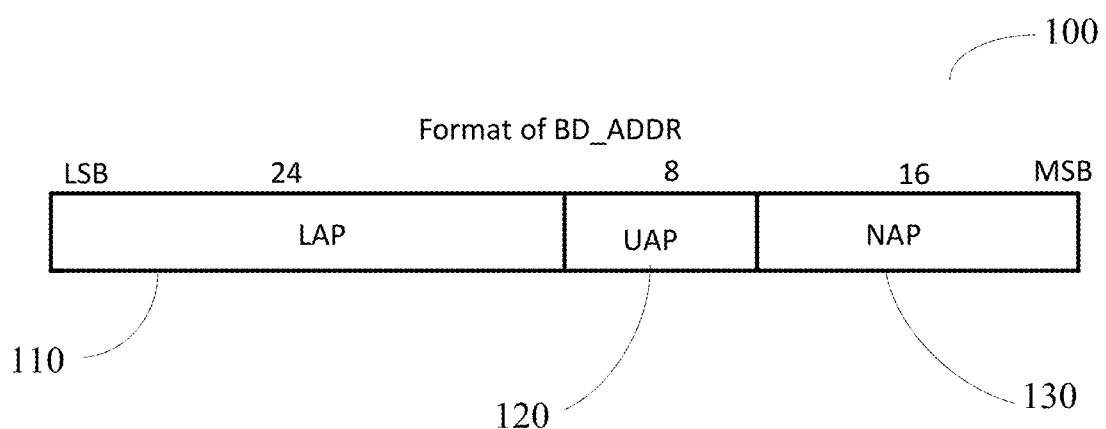
FIG. 1 is a diagram that shows the format of the unique Bluetooth Device Address (BD_ADDR)
Figure 2:
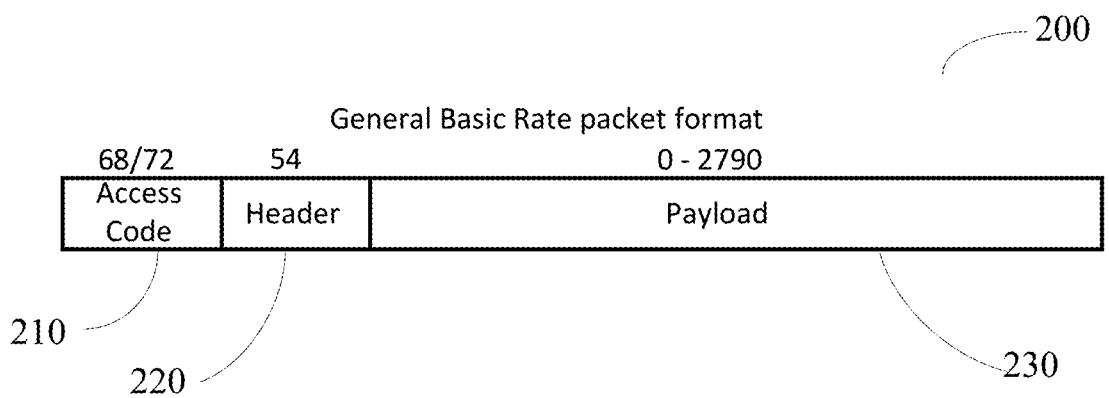
FIG. 2 is a diagram that shows the general format for the Classic Bluetooth BR packet type.
Figure 3:
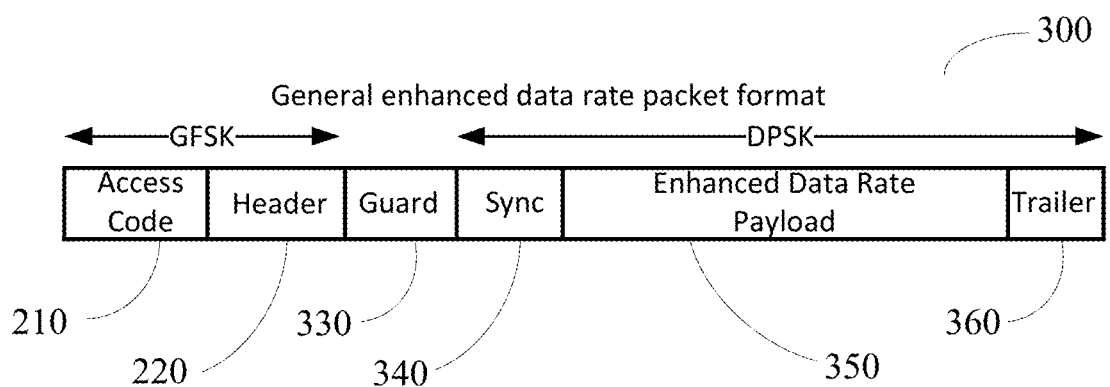
FIG. 3 is a diagram that shows the general format for packets carrying an EDR payload.
Figure 4:
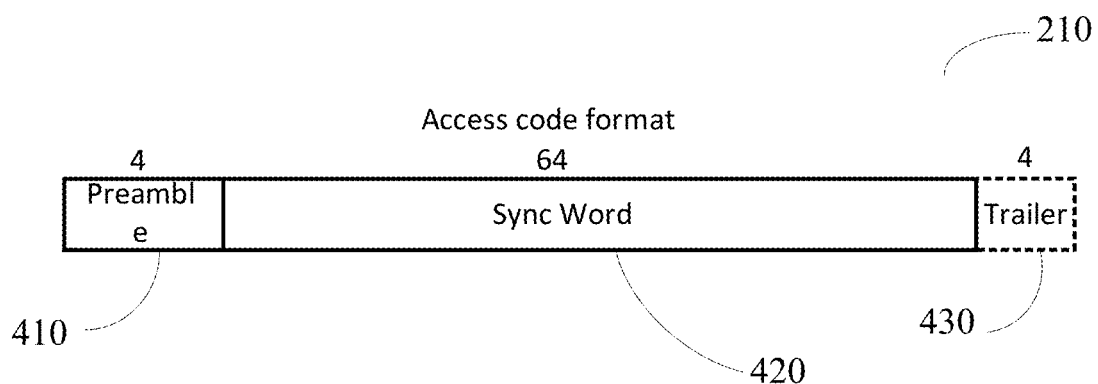
FIG. 4 is a diagram showing the GFSK Access Code.
Figure 5:
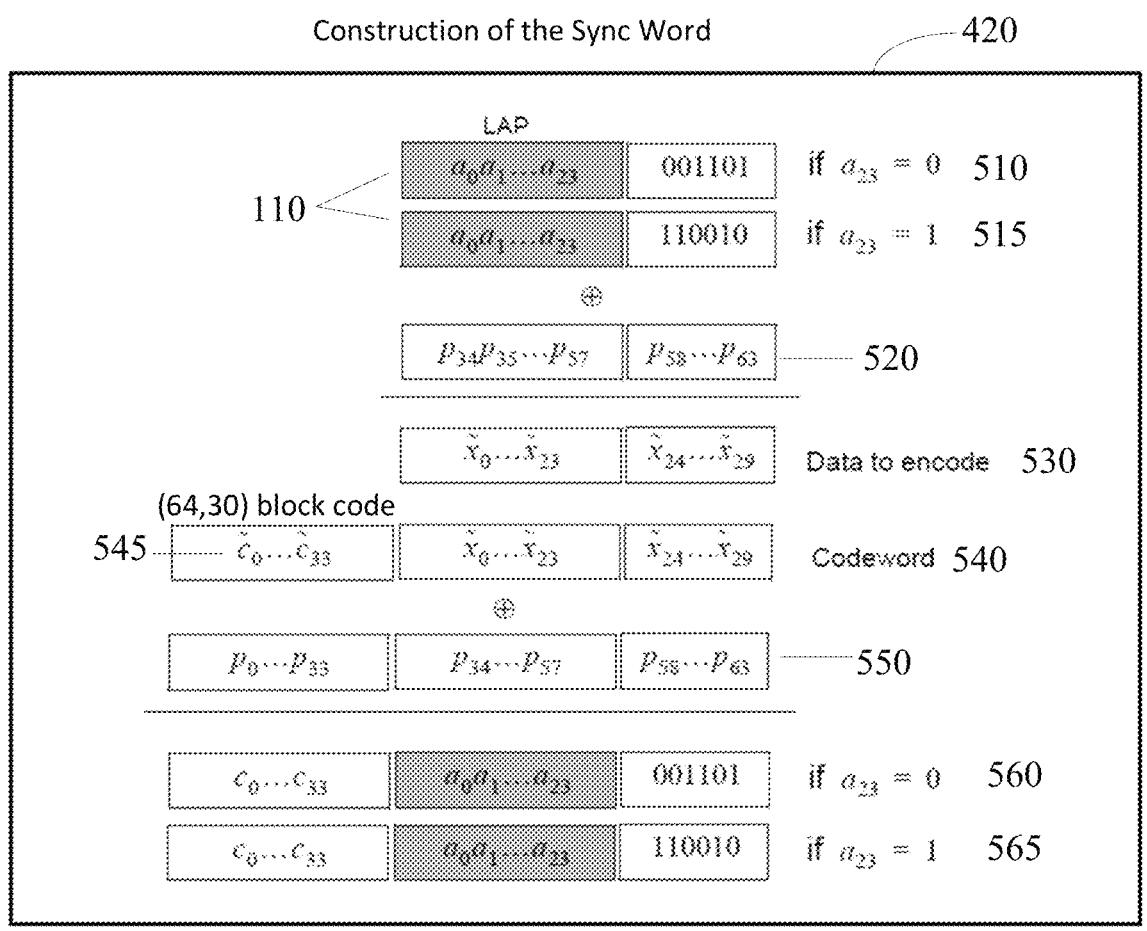
FIG. 5 is a diagram showing the construction of the 64-bit sync word.
Figure 6:
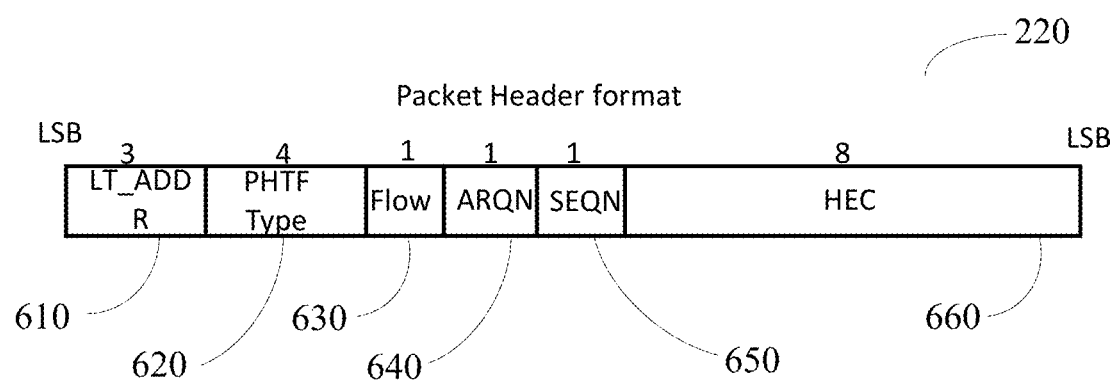
FIG. 6 is a diagram showing the format of the Packet Header.
Figure 8:
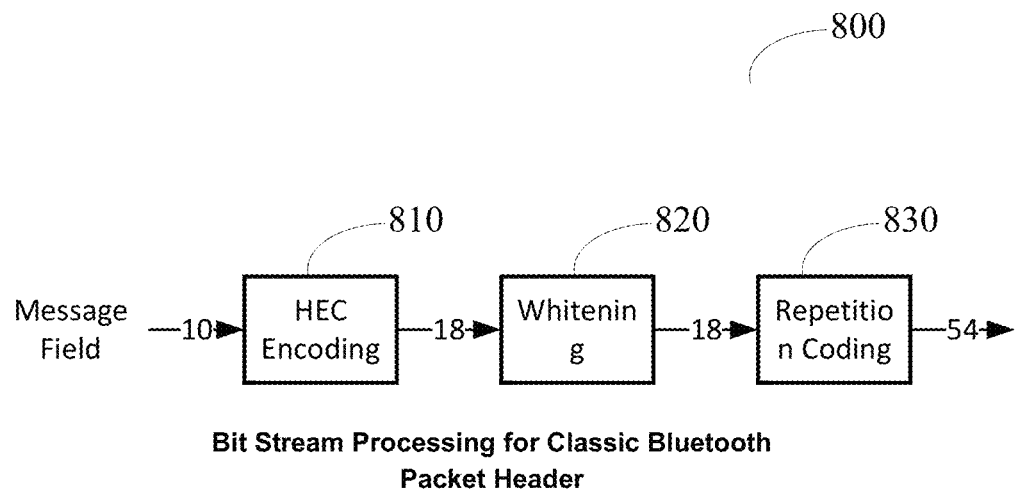
FIG. 8 is a block diagram showing the bit stream processing for encoding the 54-bit Classic Bluetooth Packet Header.

A method is disclosed for the packet header de-whitening process. As explained in FIG. 8 the whitening process produces a 10-bit information field, which includes the 4-bit Packet Header Type Field (PHTF), along with the 8-bit UAP. Without a priori knowledge of the PHTF or the UAP, a reverse HEC decoding process cannot be carried out directly.

Figure 16:
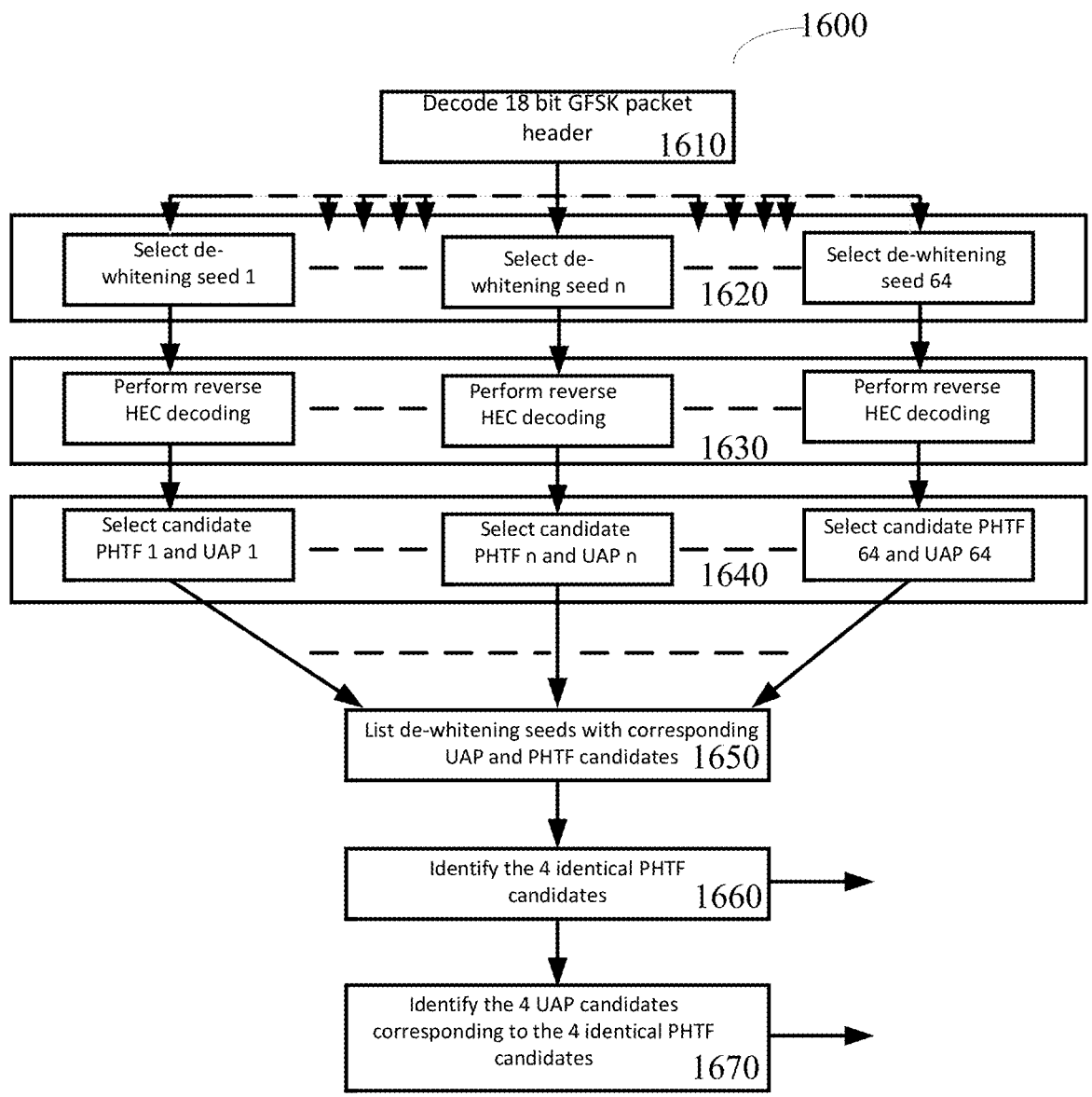
FIG. 16 is a flowchart showing an example packet header de-whitening process.

FIG. 16 is a flowchart of a process 1600 showing an example packet header de-whitening process. Process 1600 may start with step 1610 where the GFSK Packet Header is decoded. Step 1610 may be followed by step 1620 where each of the 64 possible de-whitening seeds are selected. Step 1620 may be followed by step 1630 where, a reverse HEC decoding procedure is performed for each of the 64 candidate de-whitening seeds. The reverse decoding will produce a candidate 10-bit information field, which includes the 4-bit Packet Header Type Field (PHTF), along with a candidate 8-bit UAP. Thus, in some embodiments, a portion of a packet is decoded using each of a plurality of de-whitening seeds to produce a plurality of information fields, where there is one information field for each de-whitening seed of the finite set of de-whitening seeds, and where each information field includes a candidate UAP. Step 1630 may be followed by step 1640 where the candidate PHTF, for each of the de-whitening seeds, is selected from the 10-bit information field resulting from step 1630, with a corresponding UAP, also resulting from the reverse HEC decoding step. Step 1640 may be followed by step 1650 where a list of the 64 de-whitening seeds, along with the corresponding, reverse-decoded UAPs and PHTFs, may be formed. The 16 possible PHTFs will appear in the list exactly four times each. Therefore, for a given candidate packet type, this list may be used to narrow down the candidate de-whitening indices to the four seeds which produce the PHTF corresponding to the candidate packet type. Thus, in some embodiments, a subset of the plurality of information fields is determined, each information field in the subset having a different candidate UAP. Step 1650 may be followed by step 1660 where the 4 identical PHTF candidates are identified and step 1650 may be followed by step 1670 where the 4 UAP candidates are selected, corresponding to the 4 PHTF candidates.

Therefore, for a given candidate packet type, this list of 4 seeds may be used to narrow down the candidate de-whitening indices to the four seeds which produce the PHTF corresponding to the candidate packet type.

An example method is now disclosed for forming the list of candidate packet types.

The estimated packet length, SNRs, and elements of FEC rate estimation are used in order to make a best estimate as to what the packet type is. Special checks for packet types FHS, ID, NULL, POLL, and HV1 are performed as these packets have fixed or no payloads. The remaining candidates are then sorted based on assessments that the modulation is GFSK, the packet length, and the estimated FEC rate. Packet type FHS is prioritized along with other packet types which have a CRC and a payload header. For those packet types with a payload header, or for a packet type which has a fixed payload length, for each de-whitening candidate, the expected CRC location is computed, with and without a potential MIC (associated with encryption), and a CRC check is performed of the de-whitened PDU. For variable-length packet types with a CRC but no payload header, several estimations of the CRC location are computed, based on the estimated packet length, and the CRC is computed for each de-whitening candidate and potential CRC location. Thus, in some embodiments, a CRC is performed on a CRC code in each candidate UAP of an information field in the subset until a CRC code passes the CRC. Once a CRC passes, the packet processing is marked as complete, and a single LAP, UAP, and de-whitened PDU are delivered. If, for a given packet type candidate, a CRC does not pass, all potential UAPs, and de-whitening seeds associated with the candidate packet type, along with the pointer to the decoded data for the FEC rate associated with the candidate packet type, are stored for potential delivery.

The details of a method for forming the list of candidate packet types are disclosed.

First an uncertainty-factor $\Delta_L$ for the packet length estimator $\hat{L}$, as described in equations (4) to (11) is defined, which allows for errors in the packet length estimate, $\hat{L}$. A value of $\Delta_L$=4 has been shown to provide good results in practice and may be used in some embodiments.

Figure 17A:
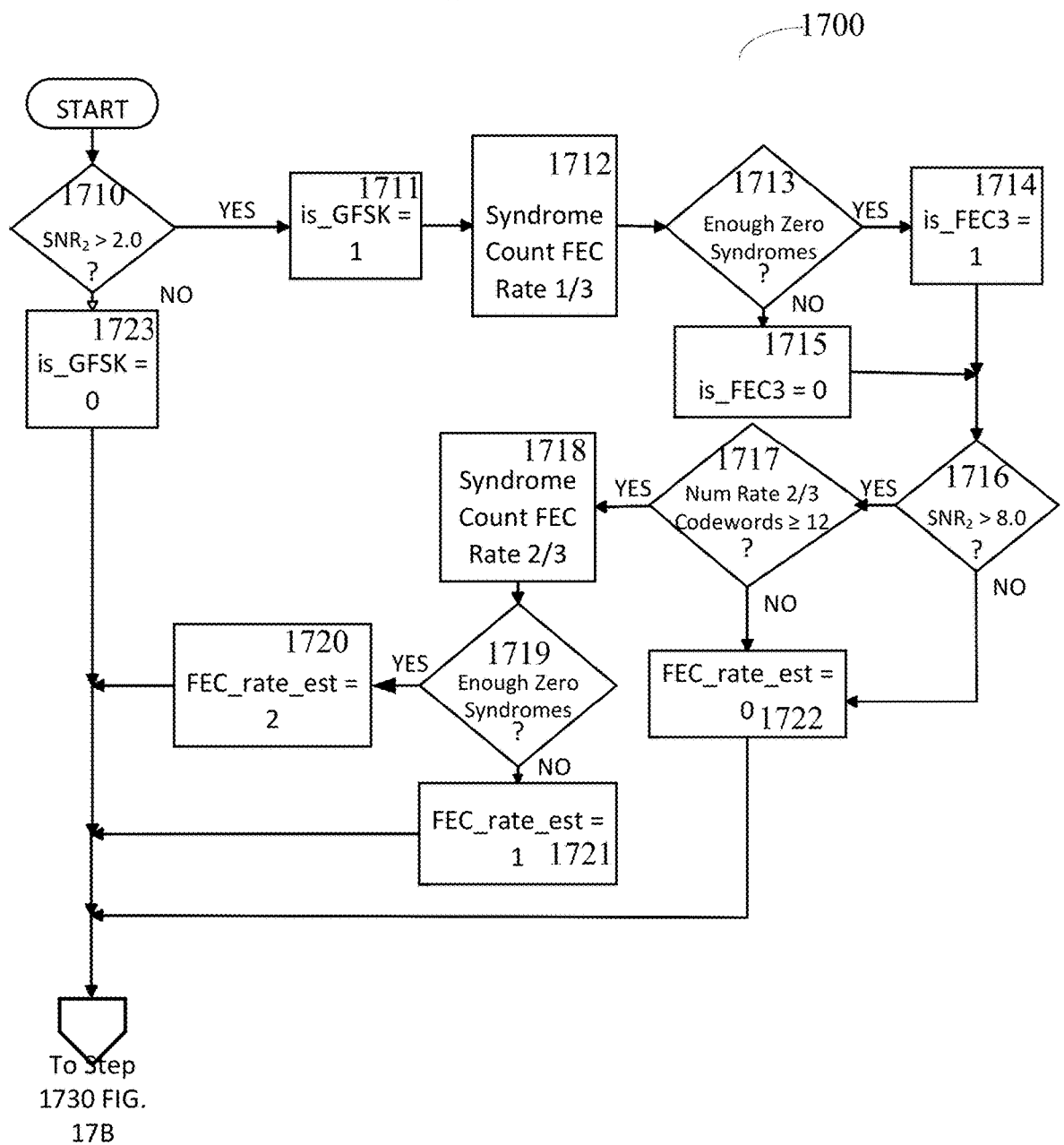
FIGS. 17A, 17B, and 17C form a flowchart for one embodiment of the disclosure for a method that creates a candidate packet type list.
Figure 17B:
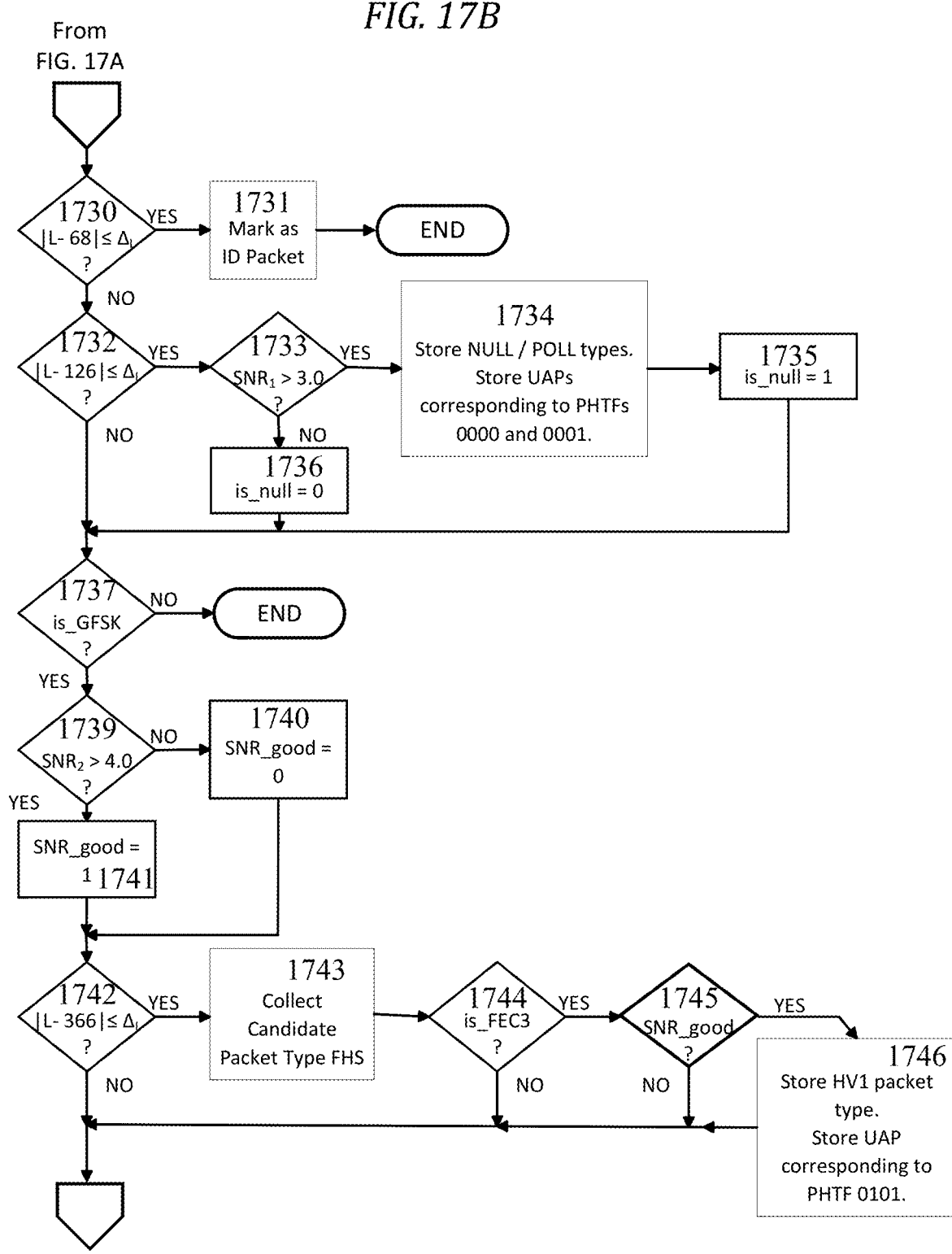

FIGS. 17A and 17B are a flowchart 1700 for one embodiment of the disclosure for a method that creates a candidate packet type list. The method may start with step 1710 of FIG. 17A. In step 1710, the value of $SNR_2$, as estimated using equation (20), is examined as a signal qualifier measured over the payload portion of the burst, to check if it exceeds a pre-determined threshold. The pre-determined threshold may be set to 2.0 in some embodiments. The payload is classified as GFSK in step 1711 if the estimate $SNR_2$, exceeds this threshold. The payload is classified as non-GFSK in step 1723 if the estimate $SNR_2$, does not exceed this threshold and step 1723 may be followed by step 1730 in FIG. 17B. If the payload is classified as GFSK in step 1711, then step 1711 may be followed by steps 1712 and 1713 where the percentage of zero-syndromes, for the rate 1/3 code, is compared to the threshold $\eta$ as described in FIG. 15 for FEC rate 1/3. If the percentage of zero syndromes is above the threshold $\eta$, then the FEC is classified as rate 1/3 in step 1714. Otherwise the FEC is classified as not rate 1/3 in step 1715.

Steps 1714 and 1715 may be followed by step 1716 where the value of $SNR_2$, as estimated using equation (21), is examined as a signal qualifier measured over the payload portion of the burst, to check if it exceeds a pre-determined threshold. The pre-determined threshold may be set, for example, to 8.0. If at step 1716 the signal qualifier, $SNR_2$, measured over the payload portion of the burst, does not exceed the pre-determined threshold, then the FEC rate estimate is set to be 0, or is undetermined, in step 1722. If at step 1716 the signal qualifier, $SNR_2$, measured over the payload portion of the burst, does exceed the pre-determined threshold, then step 1716 may be followed by step 1717 where the number of rate 2/3 codewords n are checked as described in equation (26) for FEC rate 2/3. If the number of codewords is greater or equal to 12, as discussed in FIG. 15 then the FEC is classified as possibly rate 2/3 in step 1718. Step 1718 may be followed by step 1719 where, if the number of codewords is insufficient, then the FEC rate estimate is set to be undetermined in step 1722. Step 1718 may be followed by step 1719 where the percentage of zero-syndromes, as described in equation (25), is measured and compared to the threshold η as described in FIG. 15 for FEC rate 2/3. If the percentage of zero-syndromes is above the threshold η, then the FEC is classified as rate 2/3 in step 1720. Otherwise the FEC is classified as rate 1 in step 1721. Steps 1720. 1721, and 1722 may be followed by step 1730 FIG. 17B.

FIG. 17B is the flowchart 1700 continuation from FIG. 17A. In step 1710 the packet length estimate $\hat{L}$, as estimated using equations (8) and (11), is checked against the expression $|\hat{L}-68| \le \Delta_L$. As shown in FIG. 11, the example packet duration of an ID packet is 68. Therefore, if the result of step 1710 is true, then the packet is classified as ID in step 1731 and the process ends. If the result of step 1730 is false, then step 1730 may be followed by step 1732 where the packet length estimate L is checked against the expression $|\hat{L}-126| \le \Delta_L$. If the result of step 1732 is true, then step 1732 may be followed by step 1733. In step 1733, the value of $SNR_1$, as estimated using equation (20), is examined as a signal qualifier measured over the Packet Header portion of the burst, to check if it exceeds a pre-determined threshold. The pre-determined threshold may be set to, for example, 3.0. If the signal qualifier, $SNR_1$, exceeds the pre-determined threshold, then step 1733 may be followed by step 1734.

As shown in FIG. 11, the packet duration of both NULL and POLL packets is 126. Therefore, if the result of steps 1732 and 133 are true, then the packet type may be classified as either NULL or POLL and step 1733 may be followed by step 1734 where the packet types NULL and POLL, together with their corresponding UAPs, associated with PFTFs 0000 and 0001, are stored for, possibly, later delivery to the upper layers. Step 1734 may be followed by step 1735 where it is noted that the packet has been marked as, potentially, a NULL or POLL. Step 1732 may be followed by step 1737. If in step 1733 the signal qualifier, $SNR_1$, does not exceed the pre-determined threshold, then step 1733 may be followed by step 1736 where it is noted that the packet has not been marked as, potentially, a NULL or POLL. Step 1736 may be followed by step 1737. In step 1737 the payload GFSK classification is checked. If the payload was classified as GFSK in step 1711, then step 1737 may be followed by step 1739. If the payload was classified as non-GFSK in step 1723, then the process ends. In step 1739 the value of $SNR_2$, as estimated using equation (21), is examined as a signal qualifier measured over the payload portion of the burst, to check if it exceeds a pre-determined threshold. The pre-determined threshold may be set to, for example, 4.0, in some embodiments.

Figure 17C:
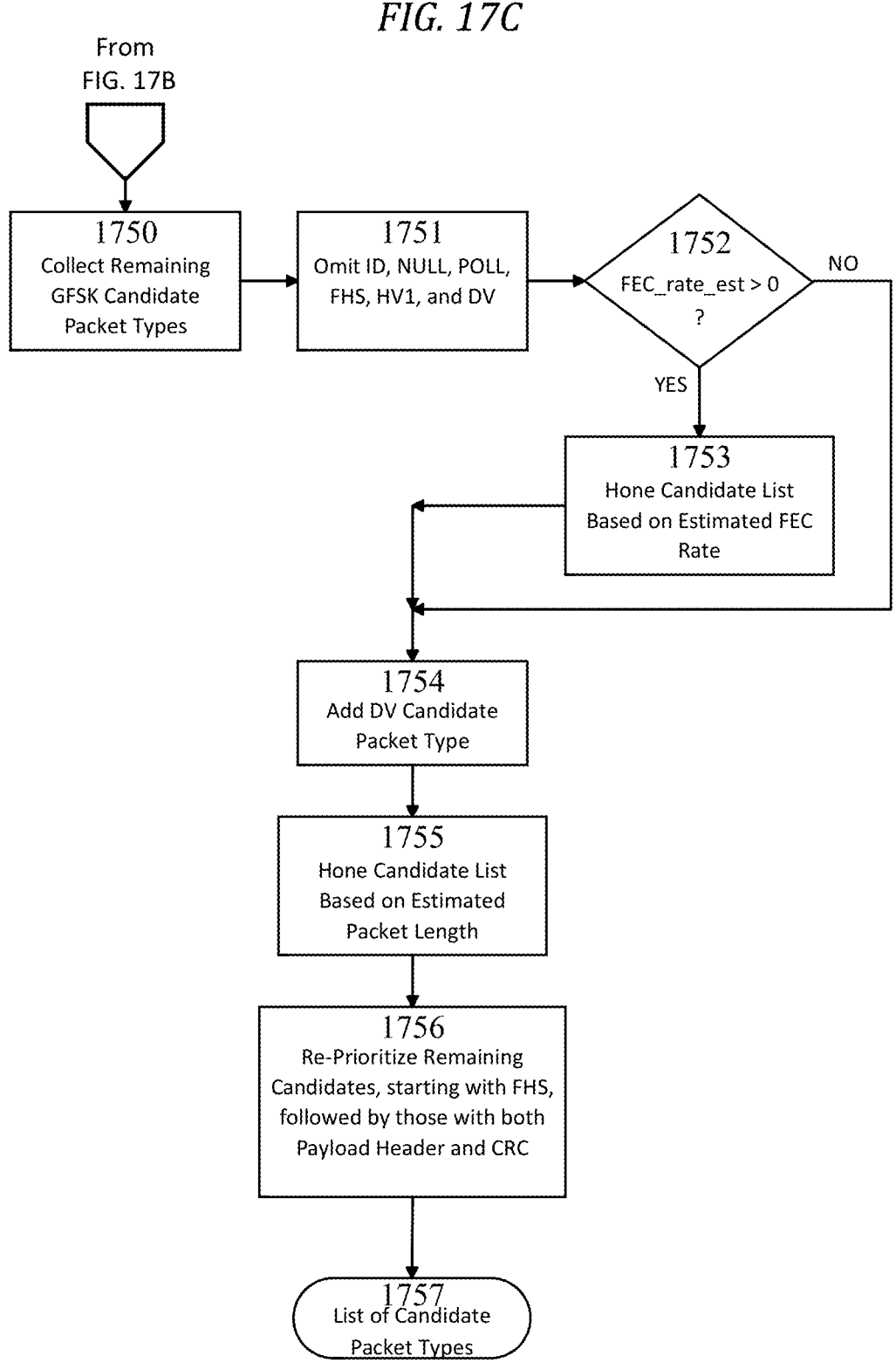

If at step 1739 the signal qualifier, $SNR_2$, does not exceed the pre-determined threshold, then this is noted in step 1740. Otherwise, in step 1741 it is noted that the signal qualifier, $SNR_2$, does exceed the pre-determined threshold. Steps 1740 and 1741 may be followed by step 1742 where the packet length estimate L is checked against the expression $|\hat{L}-366| \le \Delta_L$. If the result of step 1742 is true, then step 1742 may be followed by step 1743 where FHS is used to initialize a list of candidate packet types, and step 1743 may be followed by step 1744. If the FEC was classified as rate 1/3 in step 1714, then step 1744 may be followed by step 1745. Step 1744 may be followed by step 1745 where the result of the check in step 1739 on signal qualifier, $SNR_2$, is checked. If the signal qualifier, $SNR_2$, did exceed the pre-determined threshold, as noted in step 1741, then step 1745 may be followed by step 1746 which collects the packet type HV1, and the UAPs corresponding to PHTF 0101, for, possibly, later delivery to the upper layers. Step 1746 may be followed by step 1750 (FIG. 17C). If the result of steps 1742, 1744, or 1745 is false then those steps may be followed by step 1750 (FIG. 17C).

FIG. 17C is the flowchart 1700 continuation from FIG. 17B. In step 1750 the remaining GFSK candidate packet type may be determined. Step 1750 may be followed by step 1751 where the packet types ID, NULL, POLL, FHS, HV1 and DV are omitted from the candidate list formed in step 1750. Step 1751 may be followed by step 1752 where the FEC classification as recorded in steps 1720, 1721 and 1722 are checked. If the FEC rate is undetermined, as noted in step 1722, then step 1752 may be followed by step 1754. If the FEC rate is determined as 1 or 2/3, as noted in steps 1721 and 1720 respectively, then step 1752 may be followed by step 1753 where the candidate list is honed based upon the estimated FEC rate as noted in steps 1721 and 1720. Step 1753 may be followed by step 1754. In step 1754 packet type DV is added back into the candidate list. Step 1754 may be followed by step 1755 where the candidate list is further honed based upon the estimated packet length L as per equation (8), and packet length range associated with each of the remaining candidate packet types. Step 1755 may be followed by step 1756 where the remaining candidate packet types are prioritized starting with FHS followed by those packet types that include both a payload header and CRC as shown in FIG. 10 and also in FIGS. 18 and 19. Step 1756 may be followed by step 1757 where the process ends with a list of candidate packet types.

An example method to estimate the user payload size is disclosed below.

For candidate packet types which carry a payload header, a first set of "estimates" may be formed for the number of information bits in the packet, which includes the payload header, user payload, and CRC. Using the four de-whitening seeds which produce the PHTF associated with the given candidate, the user payload lengths may be calculated from the de-whitened payload headers, where said user payload lengths supersede any information provided by the packet length estimate. Note that any de-whitened user payload length, which, for a given candidate packet type, is outside of the range specified for the candidate packet type, will result in that seed being discarded from the list of candidate seeds. For a given, valid user payload length $m_u$, in bytes, the CRC starting location, relative to the first decoded data (i.e., non-voice) bit, is $$n_{0,CRC} = 8 \cdot (m_h + m_u)$$

where $m_h$ is the number of payload header bytes associated with the candidate packet type. If the candidate packet type allows for AES-CCM type Encryption, a second possible CRC starting position, appearing, for example, 32 bits later, is associated with the given de-whitening seed. Note that, for candidate packet types which carry both a payload header and a CRC, a given de-whitening seed may produce 0, 1, or 2 valid CRC starting positions, where 2 positions may occur for the case of candidate packet types which allow for AES-CCM type Encryption.

The second estimate for the user payload length, $m_{u,0}$, in bytes, is $$m_{u,0} = \max\left\{\min\left[\left\lfloor \frac{(\hat{L}-n_0)r}{8} + 0.5\right\rfloor - m_0, m_{u,max}\right], m_{u,min}\right\} \quad (27)$$

where: $n_0$ is the number of overhead bits, including Access Code, Packet Header, and voice bits;

$m_0$ is the total number of bytes allocated for the payload header and CRC;

r is the FEC rate associated with the candidate packet type; and $m_{u,min}$ and $m_{u,max}$ are the minimum and maximum user payload lengths, in bytes, specified for the candidate packet type FIG. 18 is a table 1800 of example particulars for the packet types that may be used in relation to equation (27). Column 1810 lists the PHTFs and column 1820 the corresponding packet types. Column 1830 lists the values for $n_o$, the number of access code, packet header and voice bits, for each packet type. Note that packet type DV is, in at least some embodiments, the only packet with voice bits. Column 1840 lists the values for $m_0$, the number of payload header and CRC in bytes. Columns 1841 and 1842 list the number of payload header and CRC bits respectively, if present. The minimum and maximum user payload sizes, in bytes, $m_{u,min}$ and $m_{u,max}$ respectively are listed in columns 1850 and 1860 respectively. Column 1870 lists the FEC rate, if used, for each packet type payload.

If the FEC rate, r, is 2/3, as per column 1870 in FIG. 18, then a packet must transmit an integer number of (15, 10) codewords. A set $\overline{\mathcal{M}}$ of candidate user payload sizes, in bytes may first be formed $$\mathcal{M}: \{\max(m_{u,0}-2, m_{u,min}) \ldots \min(m_{u,0}+2, m_{u,max})\} \quad (28)$$

In general, set $\overline{\mathcal{M}}$ includes 5 values, $$(m_{u,0}-2), (m_{u,0}-1), (m_{u,0}), (m_{u,0}+1), (m_{u,0}+2)$$

An improved user payload length for packets with rate 2/3 FEC coding may then be expressed $$m'_{u,0} = \operatorname*{argmin}_{m \in \mathcal{M}} |(n_0+15 \cdot \lceil 8(m+m_0)/10 \rceil - \hat{L})| \quad (29)$$

The final set of user payload length estimates $\mathcal{M}$, may then be formed, which includes ±one byte of additional uncertainty $$\mathcal{M}: \{\max(m'_{u,0}-1, m_{u,min}) \ldots \min(m'_{u,0}+1, m_{u,max})\} \quad (30)$$

resulting in the following second set of estimates for the number of data information bits, $n_{info,2}(m)$, which includes the user payload plus CRC and payload header in the packet, $$n_{info,2}(m) = 8 \cdot (m_0 + m) \text{ for all } m \in \mathcal{M}. \quad (31)$$

The corresponding CRC starting position, relative to the first decoded data (i.e., non-voice) bit, is $$n_{0,CRC}(m) = n_{info,2}(m) - 16 \text{ for all } m \in \mathcal{M} \quad (32)$$

A list of de-whitening seed/CRC location pairs may then be formed, where, for candidate packet types with a fixed length, each of the 4 de-whitening seeds, matched to the candidate packet type, is paired with a single, fixed CRC position. For variable-length, candidate packet types which carry a payload header and a CRC, each of the 4 de-whitening seeds is paired with 0, 1, or 2 CRC positions, as described above. For variable-length, candidate packet types which have a CRC but no payload header, each of the 4 de-whitening seeds is paired with the CRC positions $n_{0,CRC}$ (m) for all $m \in \overline{\mathcal{M}}$, as described above.

A more complete understanding of the user payload estimation, and the attendant advantages and features thereof, will be more readily understood with reference to the following example.

Assume that the packet type is EV4. From FIG. 18:
From column 1830 $n_o$=126 bits
From column 1840 $m_o$=2 bytes
From Column 1850 $m_{u,min}$=1 bytes
From Column 1860 $m_{u,max}$=120 bytes
From Column 1870 r=2/3

Assume that the number of data bits in the payload is 600, or 75 bytes. Hence the number of information bits, comprising the CRC and payload, is 616 bits (note that packet type EV4 does not include a payload header). The true packet duration is 1054 µs but assume, for this example, that the result of the estimated packet length, $\hat{L}$, as per equation (8) is 1059 µs. The initial estimate for the user payload length, $m_{u,0}$, in bytes, is From  equation (27)
$$m_{u,0} = \max\left\{\min\left[\left\lfloor \frac{(1059-126)2/3}{8}+0.5\right\rfloor - 2, 120\right], 1\right\}$$
$$m_{u,0} = 76$$

From  equation (28)
$$\mathcal{M}: \{74, 75, 76, 77, 78\}$$

Applying expression (29) the results are,

| m = | 74 | 75 | 76 | 77 | 78 |
|---|---|---|---|---|---|
| Expression (29) | 18 | 3 | 12 | 27 | 27 |

Expression (29) therefore will return m=75, the minimum result, hence the updated value for $m_{u,0}$=75 bytes, which is correct for this example. Applying equations (30) and (31) result in the estimate for the number of information bits, $n_{info,2}(m)$, comprising the CRC plus payload, as $$n_{info,2}(m) = 8*(1+75) \pm 1 = 616 \pm 1$$

An example method for checking the CRC is disclosed below.

FIG. 19 is a table of the physical layer details of each packet type. A more complete understanding of the following description will be more readily understood by reference to this table and to FIG. 20 which shows the packet structure for packet types with a payload header, message integrity check (MIC) and CRC. The whitening process 950 is described with reference to FIG. 9. The payload, which includes the MIC and the CRC, is whitened 950 using the same seed that was used for the packet header, but advanced by 18 positions. The payload header may be zero, one or two bytes long and, if present, includes the payload length indicator (5 bits and 10 bits for 1-byte and 2-byte payload headers, respectively).

Figure 21A:
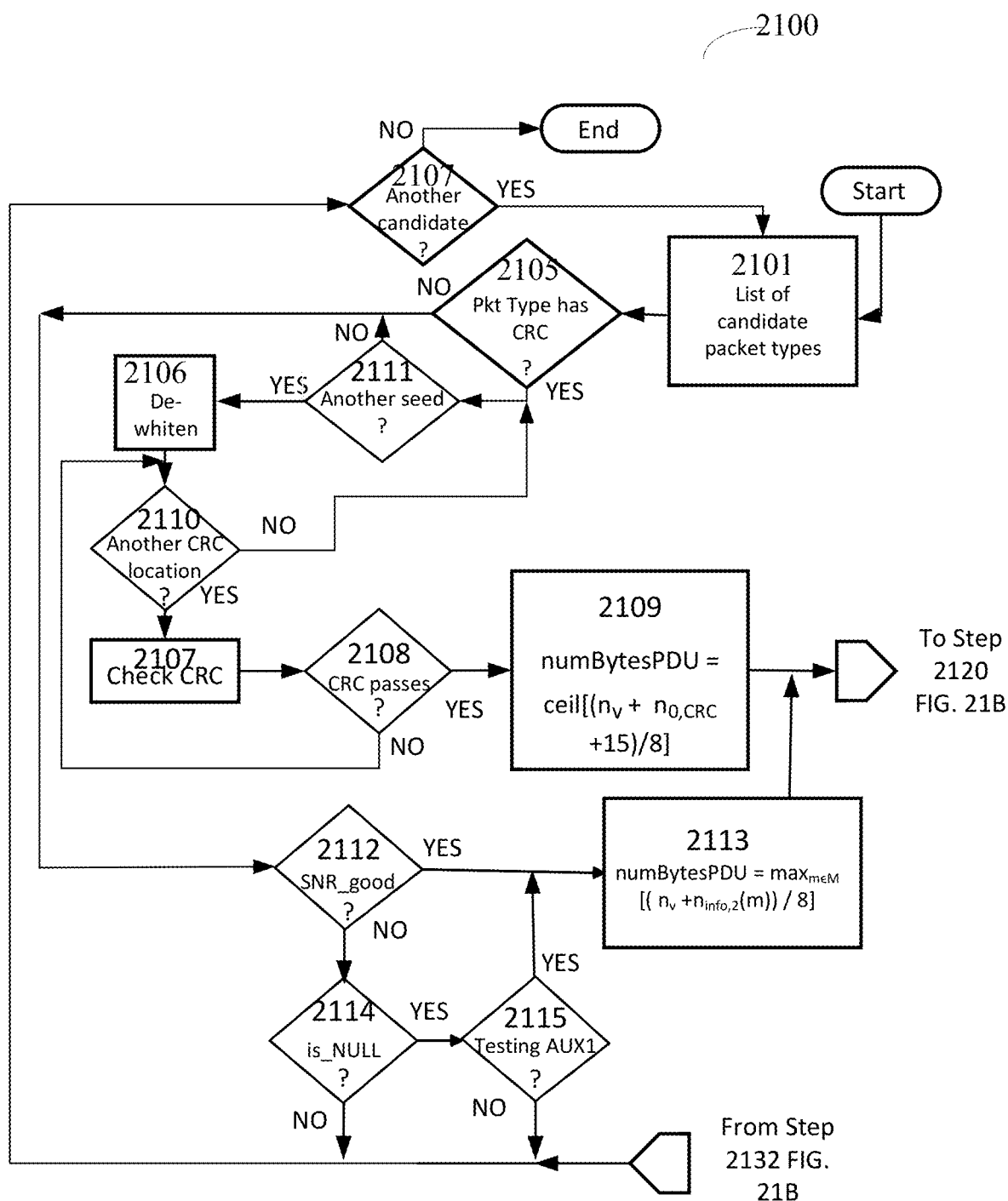
FIGS. 21A and 21B are a flowchart of an embodiment of the disclosure for the checking of the CRC.
Figure 21B:
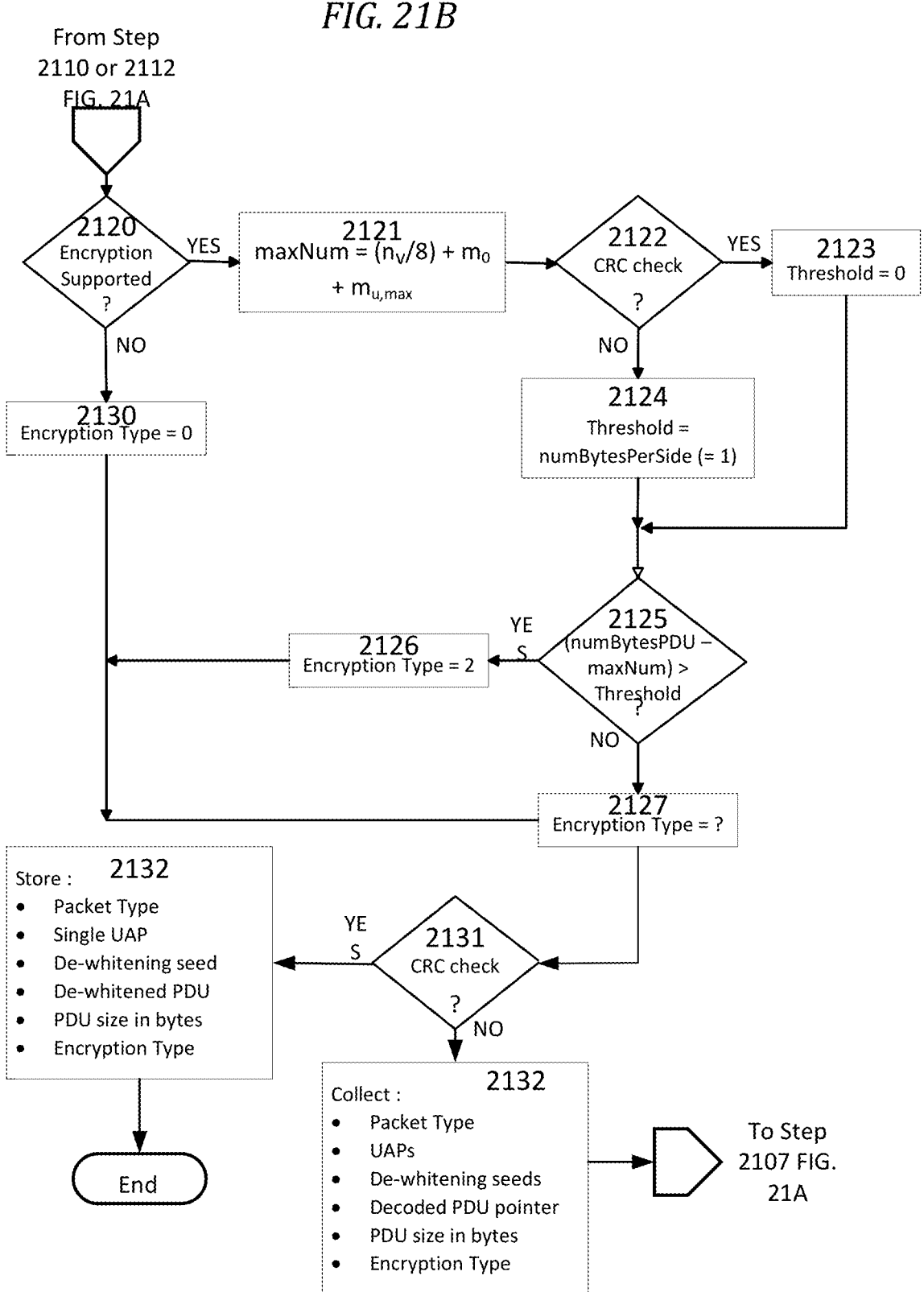

FIGS. 21A and 21B are a flowchart 2100 of one embodiment of the disclosure for the checking of the CRC. The process may start with step 2101 where the list of candidate packet types 1757 as described in FIG. 17 are imported. Step 2101 may be followed by step 2105 where it is checked if the packet type includes a CRC. If true, then step 2105 may be followed by step 2111 where a check is made to see if there is another seed to be examined. If there is, then step 2111 may be followed by step 2106 where the packet is de-whitened using the next seed in the list of candidate seeds. For a candidate packet type which has a payload header and a CRC, it is possible that all 4 de-whitened payload headers will result in no valid user payload lengths, and, in that case, de-whitening would not take place and CRC checks would not be performed. Step 2106 may be followed by step 2110 where a check is made to determine whether there is another CRC location to be examined. If there is another CRC location, then step 2110 may be followed by step 2107 where the CRC check is performed. Step 2107 may be followed by step 2108 where the result of the CRC check in step 2107 is examined. If the CRC passes, then step 2108 may be followed by step 2109 where the number of bytes in the PDU, which includes the voice bits, payload header, user payload, CRC, and MIC, is determined using the formula $$numBytesPDU = \text{ceiling}[(n_v + n_o, \text{crc} + 15)/8] \quad (33)$$

where $n_v$ is the number of voice bits (if present)
and $n_o$,crc is the starting bit index of the CRC relative to the start of the packet data.

Step 2109 may be followed by step 2120 (FIG. 21B).

If the check at step 2105 is that the packet type does not include a CRC, then step 2105 may be followed by step 2112. If the check at step 2108 is that the CRC check does not pass, then step 2108 may be followed by step 2110. If all possible CRCs have been checked, then step 2110 may be followed by step 2111 where a check is made to see if there is another seed to be examined. If all the seeds and all the possible CRCs have been examined, then step 2111 may be followed by step 2112 where the signal qualifier, $SNR_2$, threshold check as noted in step 1741 is checked. If, in step 2112, the signal qualifier, $SNR_2$, did exceed the pre-determined threshold as noted in step 1741, then step 2112 may be followed by step 2113. If, in step 2112, the signal qualifier, $SNR_2$, did not exceed the pre-determined threshold as noted in step 1740, then step 2112 may be followed by step 2114 where it is checked if the packet has been marked as, potentially, NULL or POLL in step 1735 of FIG. 17B. If the packet has been marked as NULL or POLL, then step 2114 may be followed by step 2115 where whether AUX1 is the current candidate packet type under examination is tested. AUX1 parameters are shown in FIG. 19 and AUX1 packets can have very short payloads similar to NULL and POLL packets. If the check is positive, then step 2115 may be followed by step 2113. If the checks at steps 2114 or 1115 are negative, then steps 2114 or 2115 may be followed by step 2107 where it is checked if another candidate packet is available. If all packets have been checked then the process ends. If there is another candidate packet, then step 2107 may be followed by step 2101. In step 2113 the number of bytes in the PDU, including voice bits, payload header, user payload, CRC, and MIC, is determined using the formula $$numBytesPDU = \max_{m \in \mathcal{M}} \left\lceil \frac{n_v + n_{info,2}(m)}{8} \right\rceil$$

where $n_{info,2}(m)$ is as determined in equation (31)

Step 2113 may be followed by step 2120 FIG. 21B.

Step 2120 checks if the packet type supports encryption, as per column 1930 in FIG. 19. If the packet type does not support encryption, then step 2120 may be followed by step 2130 where the encryption type is set to zero. If the packet type does support encryption, then step 2120 may be followed by step 2121 where the maximum number of bytes, maxNum, expected for a packet that does not contain a MIC, is computed using the formula $$maxNum = (n_v/8) + m_o + m_{u,max}$$

Where $n_v$ is the number of voice bits (if present),
$m_o$ is the total number of bytes allocated for the payload header and CRC,
and $m_{u,max}$ is the maximum user payload lengths, in bytes, specified for the candidate packet type Step 2121 may be followed by step 2122 where, if the CRC check carried out in step 2108 passed, then step 2122 may be followed by step 2123 where a value 'Threshold" is set to zero. If the CRC check failed in step 2108, then the step 2122 may be followed by step 2124 where a value 'Threshold" is set according to the number of bytes per side error allowance, where 1 is a suitable setting in some embodiments. Steps 2123 or 2124 may be followed by step 2125 where it is checked if the numBytesPDU value, set in step 2109 or step 2113 is greater than the maxNum value set in step 2121 by the Threshold value set in step 2123 or step 2124. If so then step 2125 may be followed by step 2126 where the Encryption Type is set to 2, otherwise, step 2125 may be followed by step 2127 where the encryption type is set to be unknown. Step 2127 and step 2130 may be followed by step 2131 where if the CRC check carried out in step 2108 passed, then step 2131 may be followed by step 2132 where the details of the packet are stored, and the process ends. If the CRC did not pass, then step 2131 may be followed by step 2131 where the details of the candidate packet are collected and added to any previous candidates that did not pass a CRC. Step 2132 may be followed by step 2107 FIG. 21A where another candidate packet is selected, if available, or the process ends.

In summary, the process described in FIG. 21A and FIG. 21B starts with selecting a packet from a list of candidate packet types and checks to see if that packet type has a CRC. If a CRC is present, then the candidate packet is de-whitened using one of the seeds established for each packet type in FIG. 16. The possible CRC is then extracted based upon the next possible location of the CRC and this CRC is checked against the packet bits. If the CRC passes, then the PDU size is computed based upon the CRC position, and the encryption type estimated. A single packet is then returned from the process with details of the UAP and de-whitened PDU. If after all the seeds and the CRC locations have been checked and no valid CRC was found, then the packet details may still be collected, and the next candidate packet type examined.

Figure 22:
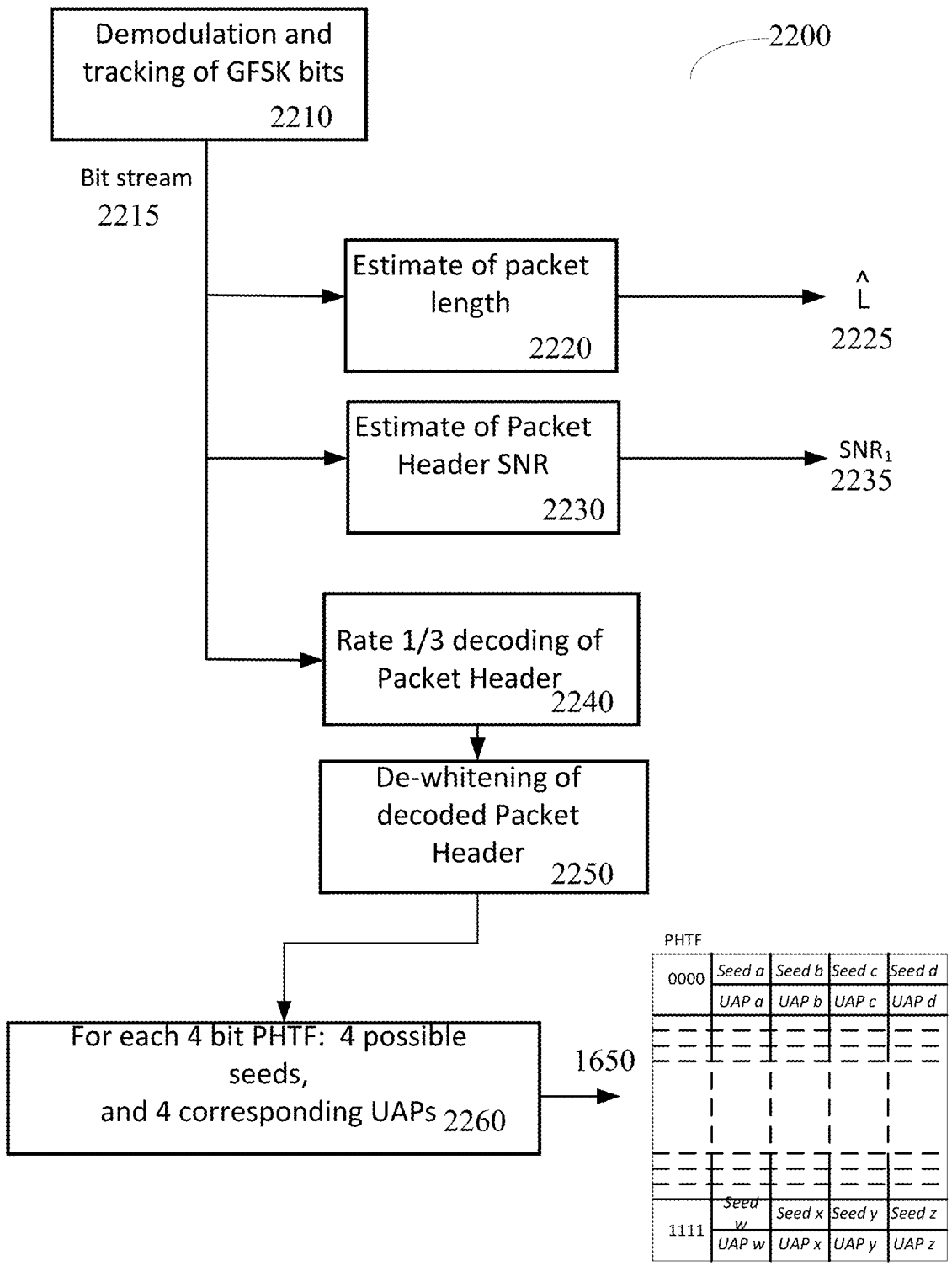
FIG. 22 is a flowchart of the process steps that are carried out on the packet header plus an estimate for the packet length.

FIG. 22 is a flowchart of a process 2200 of an example of the process steps that may be carried out on the packet header plus an estimate for the packet length. Process 2200 may start with step 2210 where the demodulation and tracking of the GFSK bits is carried out as described in equations (13) to (17). The bit stream 2215, from the GFSK demodulator is inputted to steps 2220, 2230, and 2240. In Step 2220 the packet length is estimated as described in equations (8) and (11). The estimated packet length, L 2225, is outputted from step 2220. In step 2230 the packet header SNR is estimated as described in equation (20). The estimated packet header SNR, $SNR_1$ 2235, is outputted from step 2230. In step 2240 the rate 1/3 of the packet header may be decoded as described in equation (22B). Step 2240 may be followed by step 2250 where exhaustive de-whitening of the decoded packet header, over all 64 possible de-whitening indices may be performed as described in FIG. 16. The result 2260 of step 2250 is that for each 4 bit PHTF there are 4 possible seeds together with 4 possible UAPs. This list, 1650 from FIG. 16 is the output of steps 2250 and 2260.

Figure 23:
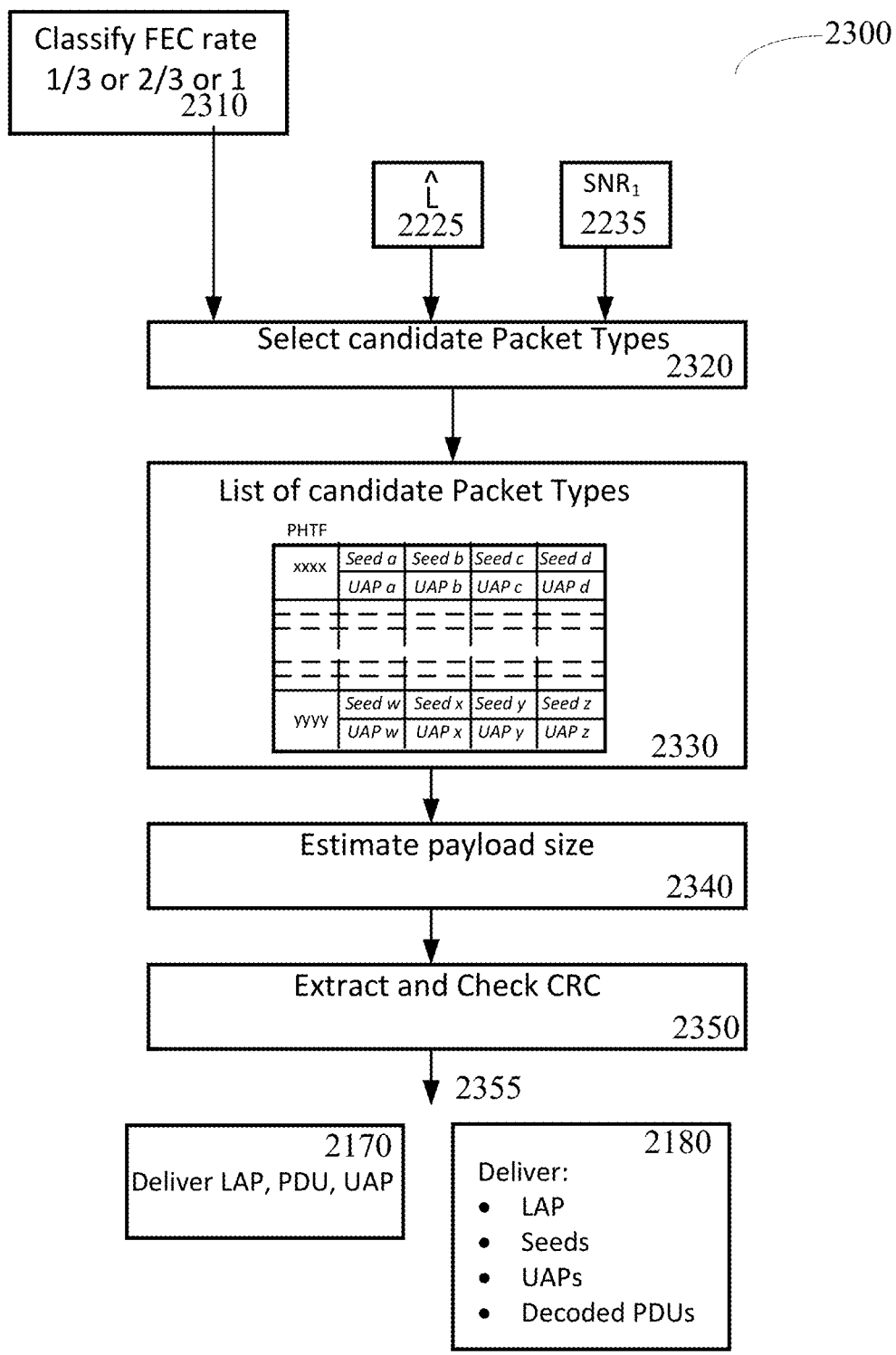
FIG. 23 is a flowchart of the process steps that are carried out on the packet payload.

FIG. 23 is a flowchart of a process 2300 of example process steps that may be carried out on the packet payload. Process 2300 may start by step 2310 where the FEC rate is classified as described in FIG. 15 and equations (23), (24), and (25). Step 2310 may be followed by step 2320. Also, from process 2200, the estimated packet length, $\hat{L}$ 2225, and the $SNR_1$ 2235 may be inputted to step 2320. Step 2320 selects the candidate packet types as described in FIG. 17. The result of step 2320 is a list of candidate packet types, which will be similar to the result of step 1650, i.e. candidate PHTFs with associated four seeds and UAPs, but with fewer candidate PHTFs. Step 2330 may be followed by step 2340 where the payload size is estimated as described in equations (27) to (31). Step 2350 may be followed by step 2350 where the CRC is extracted and then checked as described in FIGS. 21A and 21B. The output 2355 from step 2350 may comprise either a single identified packet 2170, or, if the CRC failed a small list of possible packets 2180.

Figure 24:
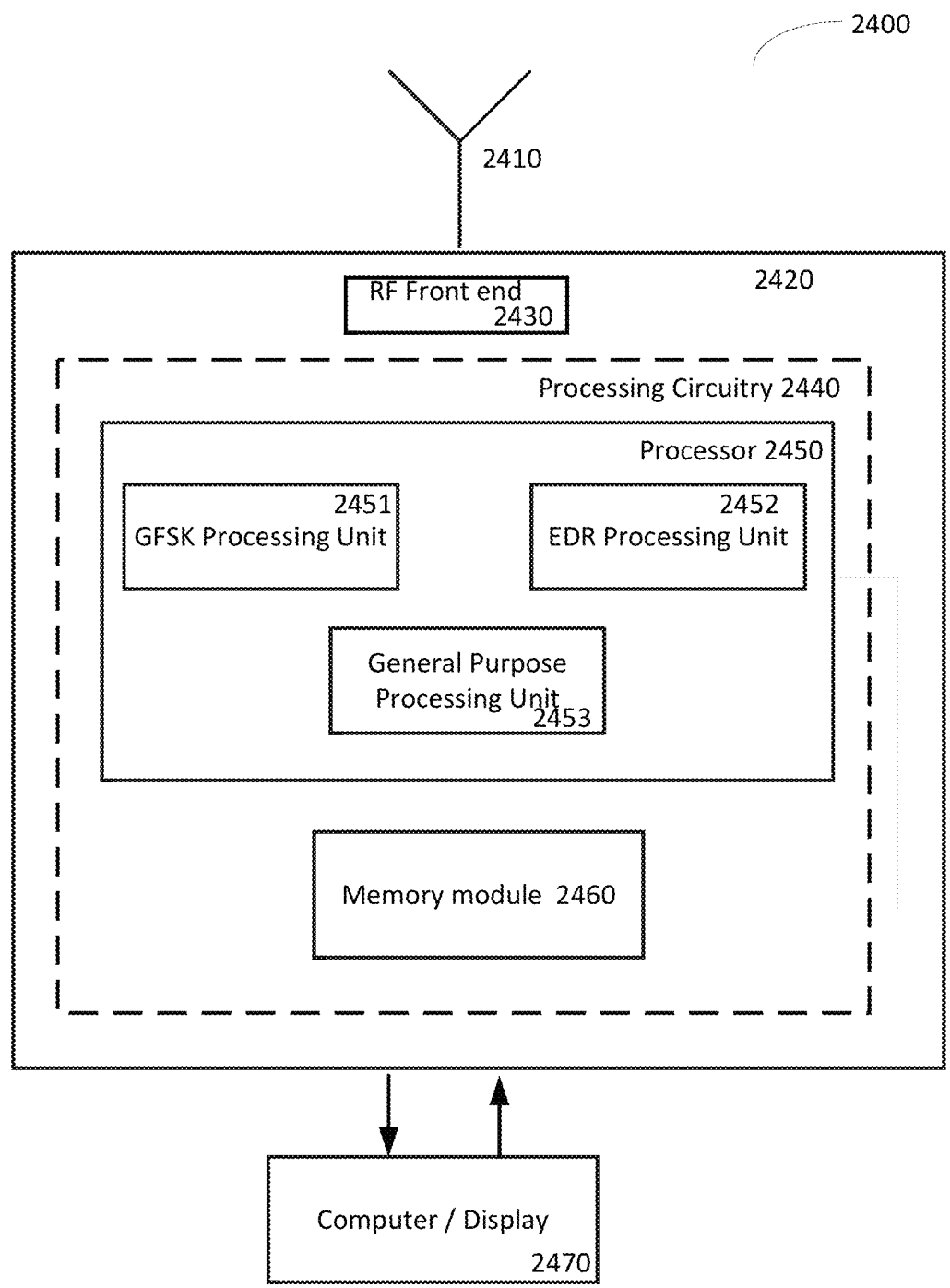
FIG. 24 is a block diagram of an example wireless receiver according to an embodiment of the disclosure that may be used as the blind Bluetooth packet receiver.

FIG. 24 illustrates a block diagram of a system 2400 according to an embodiment of the disclosure that may be used as the blind Bluetooth packet receiver described herein. System 2400 includes a wireless receiver 2420, an antenna 2410 which may be tuned to receive Bluetooth packets and a computer/display 2470.

In some embodiments, the wireless receiver 2420 includes an RF front end 2430, and processing circuitry 2440. The RF front end 2430 may perform the usual functions of an RF receiver front end such as low noise amplification, filtering and frequency down conversion so as to condition the received signal suitable for the processing in the processing circuitry 2440. In some embodiments the processing circuitry 2440 includes a processor 2450 and a memory module 2460. In some embodiments the processor 2450 includes a GFSK Processing unit 2451, an EDR Processing unit 2452 and a general purpose processing unit 2453. The GFSK Processing unit 2451 and/or the EDR Processing unit 2452 may be processors with separate software stored in a memory such as the memory module 2560, or may be processors with embedded software such as an FPGA, ASIC, etc. In some embodiments, the GFSK Processing unit 2451 and/or the EDR Processing unit 2452 may be software that is executed by the general purpose processing unit 2453. In some embodiments, the GFSK Processing unit 2451 and/or the EDR Processing unit 2452 may be implemented by or as a part of the processing circuitry 2440. The processor 2450 may also provide general purpose processing unit 2453, and the processing circuitry 2440 may also include a memory module 2560 that may be configured to perform the packet processing procedures of this disclosure, for example, as described in FIGS. 21 and 22, as well as elsewhere herein.

The processing circuitry 2440 may be configured to control any of the methods and/or processes described herein and/or to cause such methods, and/or processes to be performed, e.g., by the wireless receiver 2420. Processor 2450 corresponds to one or more processors 2450 for performing the wireless receiver 2420 functions described herein. The memory module 2460 is configured to store data, programmatic software code and/or other information described herein. In some embodiments, the software may include instructions that, when executed by the processing circuitry 2440, causes the processing circuitry 2440 to perform the processes described herein with respect to the wireless receiver 2420 and processor 2450.

In addition to or instead of a processor such, as a central processing unit, and memory, the processing circuitry 2440 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. The processor 2450 may be configured to access (e.g., write to and/or read from) the memory module 2460, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). In some embodiments, the receiver 2420 includes the processing circuitry 2440 configured to detect a packet using blind LAP detection, the detecting including providing symbol timing estimation and frequency and DC offset correction. The processing circuitry 2440 is further configured to estimate a duration of a payload of the packet and decode a payload of the packet over the estimated duration according to each of a plurality of forward error correction (FEC) coding rates to produce a packet header. The processing circuitry 2440 is further configured to: for each of a plurality of de-whitening seeds, perform de-whitening, extraction and reverse decoding on the packet header to produce a plurality of information fields, one information field for each de-whitening seed, each information field including a candidate upper address part (UAP). The processing circuitry 2440 is further configured to obtain a subset of the candidate UAPs, each candidate UAP having a corresponding CRC code. The processing circuitry 2440 is further configured to form an ordered list of candidate packet types based at least in part on the estimated duration and perform a cyclic redundancy check (CRC) on the CRC code in each candidate UAP corresponding to a candidate packet type in the ordered list until a CRC code passes the CRC. The processing circuitry 2440 is also configured to select a UAP having the CRC code that passes the CRC, and return a packet data unit (PDU) corresponding to the selected UAP.

According to this aspect, in some embodiments, the blind LAP detection, payload duration estimation, and payload decoding is aided by collision detection. In some embodiments, estimating the payload duration is based at least in part on: calculating a first estimate based on a comparison of a look-ahead maximum energy and a running average of received energy; and calculating a second estimate based on subtraction of a first symbol and a factor accounting for a ramp-down of a power amplifier. In some embodiments, the processing circuitry 2440 is further configured to: estimate a modulation index based at least in part on averaging deviations over the packet header; and calculate a signal to noise ratio for the packet header and for the payload of the packet. In some embodiments, the decoding includes classifying an FEC rate as one of 1/3 and 2/3 based on a measured rate of zero syndrome occurrences. In some embodiments, the processing circuitry 2440 is further configured to create a table of de-whitening seeds, where for each de-whitening seed there is a corresponding reverse decoded UAP and a packet header type field (PHTF) in the table. In some embodiments, forming the ordered list of candidate packet types comprises: estimating a packet type based at least in part on packet length, signal to noise ratio (SNR), and elements of FEC rate estimate; performing a check for packet types based on the estimate; and sorting a remaining set of candidate packets based at least in part on whether modulation is Gaussian frequency shift keying (GFSK), and based at least in part on packet length estimate and estimated FEC rate. In some embodiments, the processing circuitry 2440 is further configured to: for packet types having one of a payload header and a fixed payload length, and for each de-whitening candidate, compute an expected CRC location and perform a CRC of the PDU based on the computed expected CRC location. For variable length packet types with a CRC code but no payload header, in some embodiments, the processing circuitry 2440 is further configured to compute a plurality estimations of a CRC location based on an estimated payload duration; and perform a CRC for each de-whitening candidate and potential CRC location. In some embodiments, the processing circuitry 2440 is further configured to, when a packet type has a CRC code, perform a CRC and when the CRC passes, the processing circuitry 2440 is configured to de-whiten the packet using a seed established for the packet type, compute a PDU size based upon a position of the CRC code, and estimate an encryption type. In some embodiments, the processing circuitry 2440 is further configured to, when all seeds have been checked and no valid CRC is found, return packet information.

In some embodiments, the processing circuitry is configured to perform blind decoding of data packets, such as by general purpose processing unit 2453. In some embodiments, the processing circuitry 2440 is configured to determine a lower address part (LAP) of a packet by comparing a portion of the packet to at least one synchronization word. The processing circuitry 2440 is further configured to decode a portion of the packet using each of a plurality of de-whitening seeds to produce a plurality of information fields, one information field for each de-whitening seed, each information field including a candidate upper address part (UAP). The processing circuitry 2440 is further configured to determine a subset of the plurality of information fields, each information field in the subset having a different candidate UAP, each candidate UAP having a corresponding CRC code. The processing circuitry 2440 is further configured to perform a cyclic redundancy check (CRC) on the CRC code in each candidate UAP of an information field in the subset, until a CRC code passes the CRC, select a UAP having the CRC code that passes the CRC, and select a packet data unit (PDU) corresponding to the selected UAP.

In some embodiments, the processing circuitry 2440 is further configured to determine a location of the CRC code within a candidate PDU based on a packet type of the candidate PDU, the candidate PDU corresponding to one of the different UAPs. In some embodiments, the processing circuitry 2440 is further configured to select the packet type from a list of packet types based at least in part on a comparison of a measurement of a signal qualifier over a payload portion of the decoded PDU to a first threshold. In some embodiments, the processing circuitry 2440 is further configured to obtain the list of packet types based at least in part on a length of the decoded PDU. In some embodiments, the sequence of bits is 64 bits long; there are 64 possible de-whitening seeds, and the first set of candidate PDUs has 16 candidate PDUs, each having a 4-bit packet header type field (PHTF) and a corresponding 8-bit UAP occurring in the first set four times. In some embodiments, the decoding includes reverse header error check, HEC, decoding. In some embodiments, the decoding includes application of a Gaussian frequency shift keyed (GFSK) access code serving as a synchronization word for the decoded PDU to the packet. In some embodiments, the GFSK access code is determined by comparing a synchronization word from the LAP to each one of a plurality of sample synchronization words. In some embodiments, the processing circuitry 2440 is further configured to estimate a length of the packet based at least in part on a running average of received energy over a specifiable number of symbols of the packet.

According to an embodiment of the disclosure, a computer/display 2470 may be connected wirelessly or via a physical communications connection to the wireless receiver 2420. In some embodiments, the computer/display 2470 may be a computer system with an associated display module such as a laptop or tablet computer or may be a computer system with a separate display monitor. The computer/display 2470 may be used as an operator interface to the wireless receiver 2420 and to display the results of the Bluetooth blind decoding. The calculations described in this disclosure may be performed using software on the processor 2450 and memory module 2460 combination or, indeed on the computer/display 2470. In some embodiments described herein, the term "coupled," "connected," and the like, may be used herein to indicate a connection, although not necessarily directly, and may include wired and/or wireless connections. Also, it is contemplated that system 2400 can be provided in a single physical housing or in separate physical housings.

Figure 25:
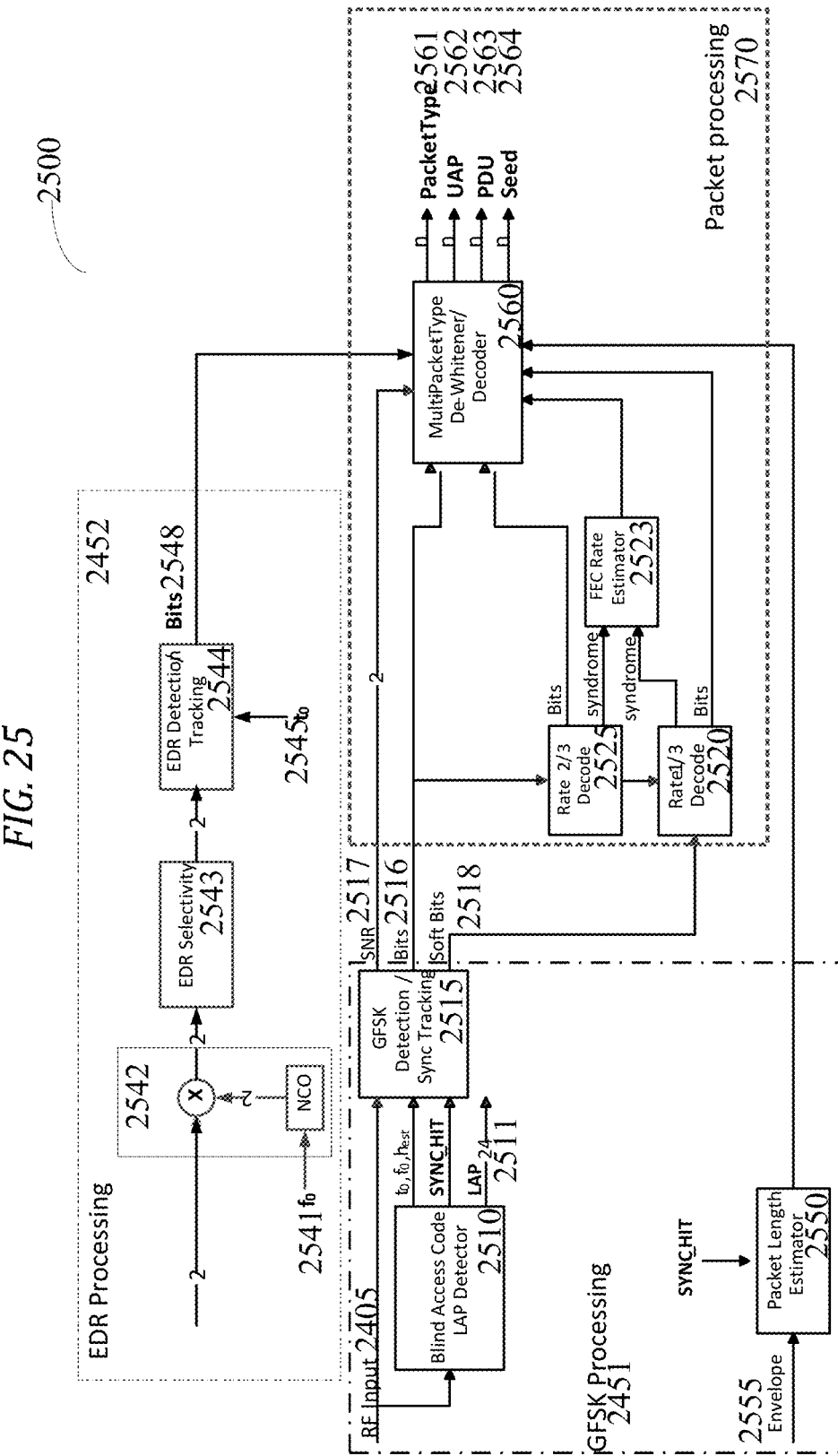
FIG. 25 is a block diagram showing an example of blind detection and decoding of Classic Bluetooth packets.

FIG. 25 is a block diagram 2500 for an example blind detection and decoding of Classic Bluetooth packets. The GFSK processing unit 2451 includes the Blind Access Code/LAP detector 2510, the packet length estimator 2550 and the GFSK detection/sync tracking block 2515. The Blind Access Code/LAP detector 2510, continuously searches the RF input 2505 for a leading sync word, where, upon detection, a 24-bit LAP 2511 is delivered. In particular, the Blind Access Code/LAP detector 2510 is configured to determine a lower address part (LAP) of a packet by comparing a portion of the packet to at least one synchronization word. In addition, initial estimates of the symbol timing, frequency offset, and, possibly, the modulation index, are delivered to the GFSK Detection/Sync Tracking block 2515. For an EDR-enabled detector, the initial symbol timing, to 2545 and frequency offset estimates, $f_o$ 2541 computed by the LAP detector, are also made available to the EDR signal processing section 2452. The EDR signal processing unit 2452 comprises the complex demodulator 2542 followed by the EDR selectivity block 2543 and the EDR detector/tracking block 2544. The initial frequency offset estimate, $f_o$ 2541, is used to frequency-correct the input to the complex demodulator 2542, and the initial symbol timing estimate, to 2545, is used to initialize the timing search window for the EDR sync word detector/tracker 2544. The GFSK Detection/Sync Tracking block 2515 produces soft bits 2518, starting with the Packet Header, through the end of the prospective packet, while the Packet Length Estimator 2550 computes the packet duration based on the envelope signal 2555 observed at the GFSK selectivity filter output.

An EDR-enabled detector 2544 correlates against the known EDR sync word, and, if the EDR sync word is detected, will produce a stream of EDR bits 2548 that may override the GFSK bit stream 2516. Conversely, the GFSK Detector block 2515 produces a pair of SNR qualifiers 2517 for the Packet Header and payload portions of the burst, respectively, ($SNR_1$ and $SNR_2$ as described in equations (20) and (21)) which may be used to classify the packet as GFSK, and also, to qualify Packet Headers and PDUs which do not have the benefit of a valid CRC. Additionally, the GFSK path may also include blocks 2520, 2525, and 2530 which cover the three possible FEC coding rates; 1, 2/3 or 1/3 with block 2530 providing an estimate of the FEC coding rate, as determined using equations (22) to (26) and FIG. 15, which helps narrow down the list of candidate packet types. The role of the Multi-Packet-Type De-Whitener/Decoder block 2560 is to assemble all of the information and form a best estimate at the Packet Type 2561, UAP 2562, PDU 2563 and the seed 2564, as is described and detailed with respect to FIG. 21.

The packet processing unit 2570 that contains the processes of rate decoding and packet identification, blocks 2520, 2523, 2525 and 2560 may be performed via processing circuitry such as a processor and a memory, ASIC, FPGA, etc., that execute programmatic software. In some embodiments, the packet processing unit 2570 is part of the wireless receiver 2420. In other embodiments, the packet processing unit is implemented in a device other than the wireless receiver 2420.

Figure 26:
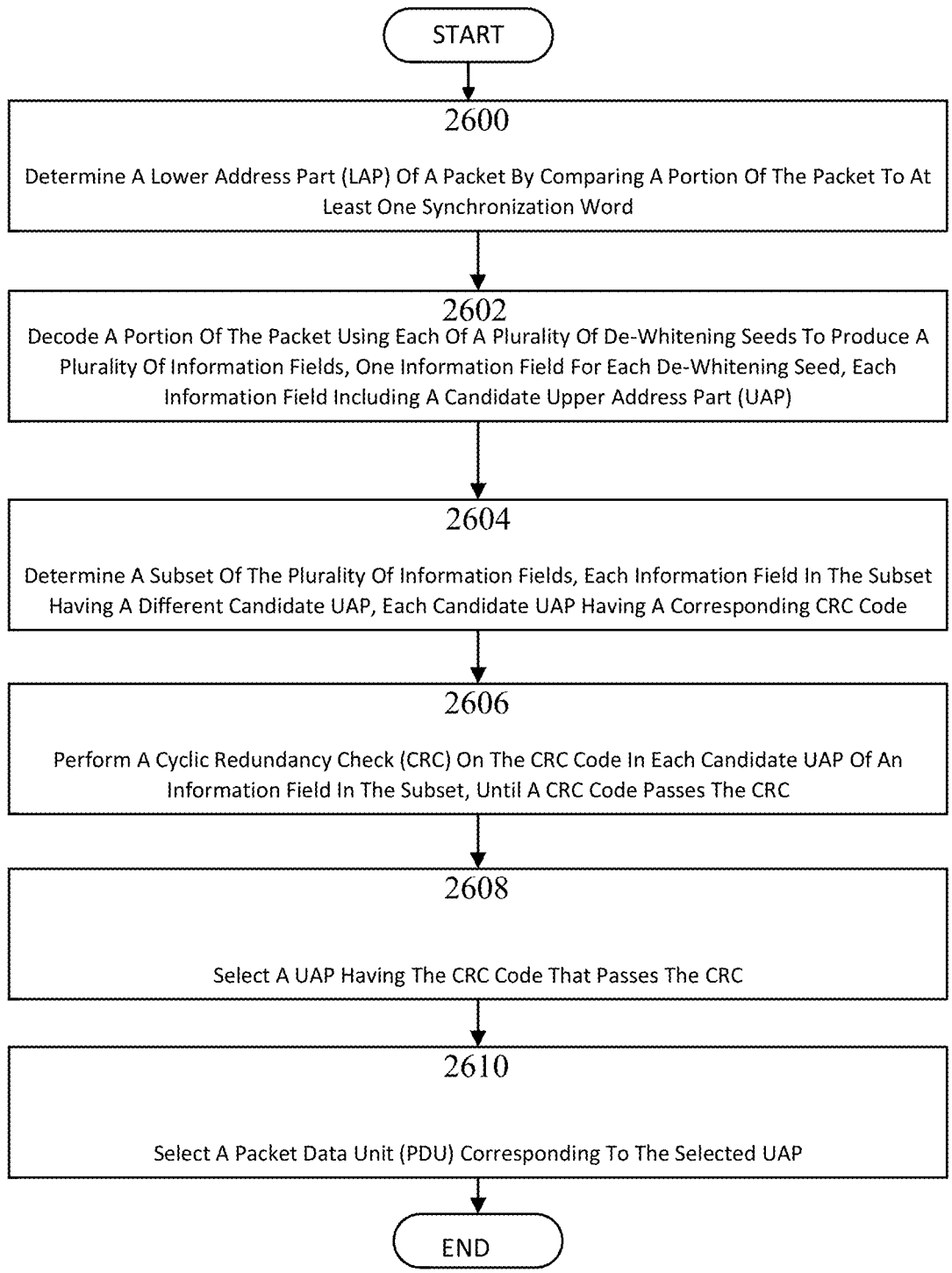
FIG. 26 is a flowchart of an exemplary process for blind decoding of packets according to principles set forth herein.

FIG. 26 is a flowchart of an exemplary process for blind decoding of data packets in a receiver. The process may be performed by the processing circuitry 2440. The process includes determining a lower address part (LAP) of a packet by comparing a portion of the packet to at least one synchronization word (step 2600). This step may be done by blind access code/LAP detector 2510. The process also includes decoding the packet using each of a plurality of de-whitening seeds to produce a plurality of information fields, one information field for each de-whitening seed, each information field including a candidate upper address part (UAP) (step 2602). The process also includes determining a subset of the plurality of information fields, each information field in the subset having a different candidate UAP, each candidate UAP having a corresponding CRC code (step 2604). The process further includes performing a cyclic redundancy check (CRC) on the CRC code in each candidate UAP, until a CRC code passes the CRC check (step 2606). The process includes selecting a UAP having the CRC code that passes the CRC (step 2608) and selecting a packet data unit (PDU) corresponding to the selected UAP (step 2610). Any one or more of steps 2602-2610 may be performed by the multi-packet type de-whitener/decoder 2560 of the packet processing unit 2570.

In some embodiments, the process further includes determining via the processing circuitry 2440, a location of the CRC code within a candidate PDU based on a packet type of the candidate PDU, the candidate PDU corresponding to one of the different candidate UAPs. In some embodiments, the packet type includes packets having at least one of a payload header, a fixed payload length, and a variable length. In some embodiments, the process further includes selecting via the processing circuitry 2440, the packet type from a list of packet types based at least in part on a comparison of a measurement of a signal qualifier over a payload portion of the decoded PDU to a first threshold. In some embodiments, obtaining the list of packet types based at least in part on a length of the decoded PDU. In some embodiments, the sequence of bits is 64 bits long, there are 64 possible de-whitening seeds; and the first set of candidate PDUs has 16 candidate PDUs, each having a 4-bit packet header type field (PHTF) and a corresponding 8-bit UAP occurring in the first set four times. In some embodiments, the decoding includes reverse header error check, HEC, decoding. In some embodiments, the decoding includes application of a Gaussian frequency shift keyed (GFSK) access code serving as a synchronization word for the decoded PDU to the packet. In some embodiments, the GFSK access code is determined by comparing a synchronization word from the LAP to each one of a plurality of sample synchronization words. In some embodiments, the process also includes estimating a length of the packet based at least in part on a running average of received energy over a specifiable number of symbols of the packet.

Figure 27:
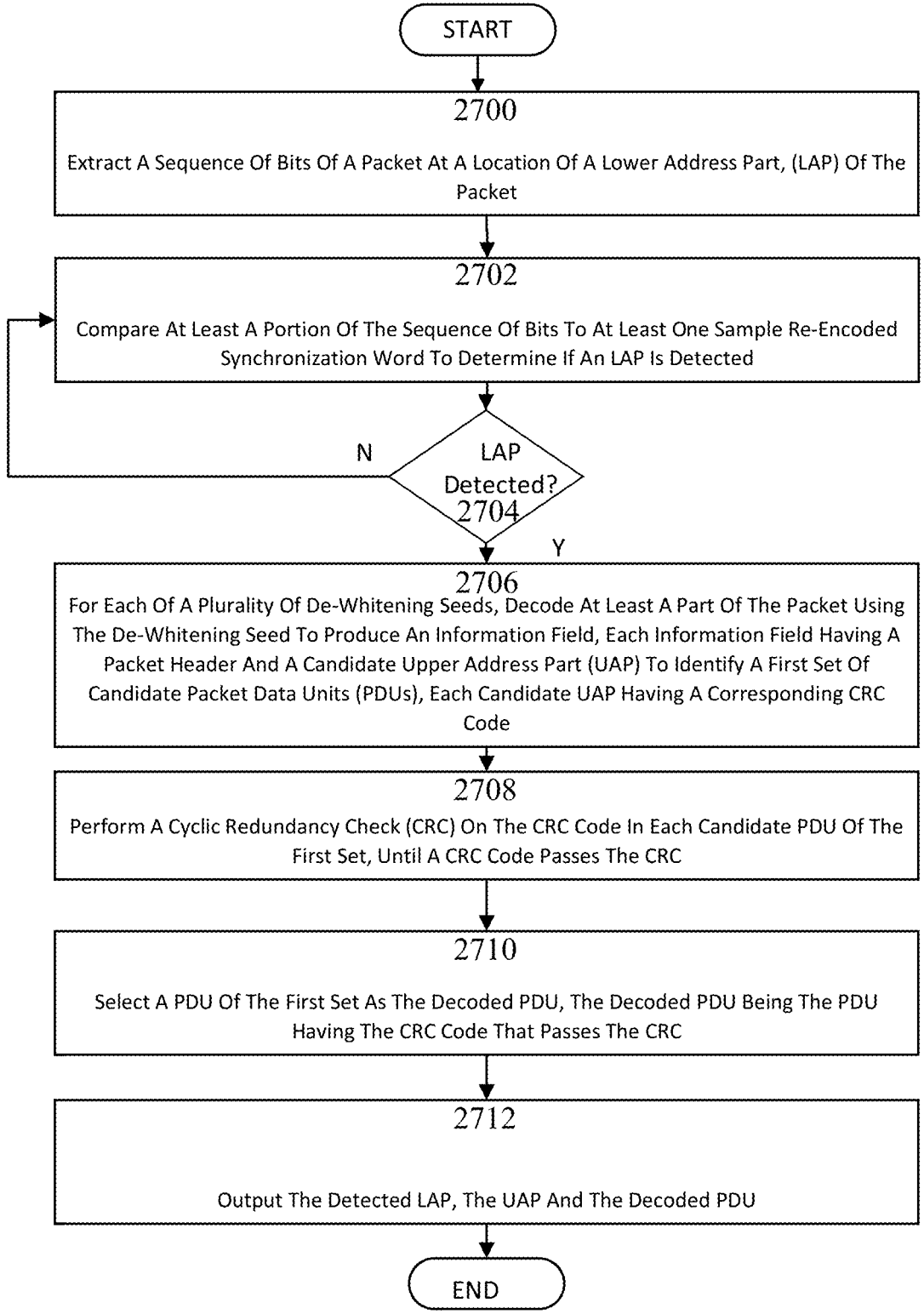
FIG. 27 is a flowchart of an alternative process for blind decoding of packets.

FIG. 27 is a flowchart of an exemplary process of decoding data packets in a wireless receiver. The process may be performed by processing circuitry 2440. For each of at least one packet, the process includes extracting a sequence of bits of a packet at a location of a lower address part, (LAP) of the packet (step 2700). The process also includes comparing at least a portion of the sequence of bits to at least one sample re-encoded synchronization word to determine if an LAP is detected (step 2702). When an LAP is detected (step 2704), then: for each of a plurality of de-whitening seeds, decoding at least a part of the packet using the de-whitening seed to produce an information field, each information field having a packet header and a candidate upper address part (UAP) to identify a first set of candidate packet data units (PDUs), each candidate UAP having a corresponding CRC code (step S2706). The process further includes, when the LAP is detected, performing a cyclic redundancy check (CRC) on the CRC code in each candidate PDU of the first set, until a CRC code passes the CRC (step 2708). Also, the process includes selecting a PDU of the first set as the decoded PDU, the decoded PDU being the PDU having the CRC code that passes the CRC (step 2710), and outputting the detected LAP, the UAP and the decoded PDU (Step 2712).

Figure 28:
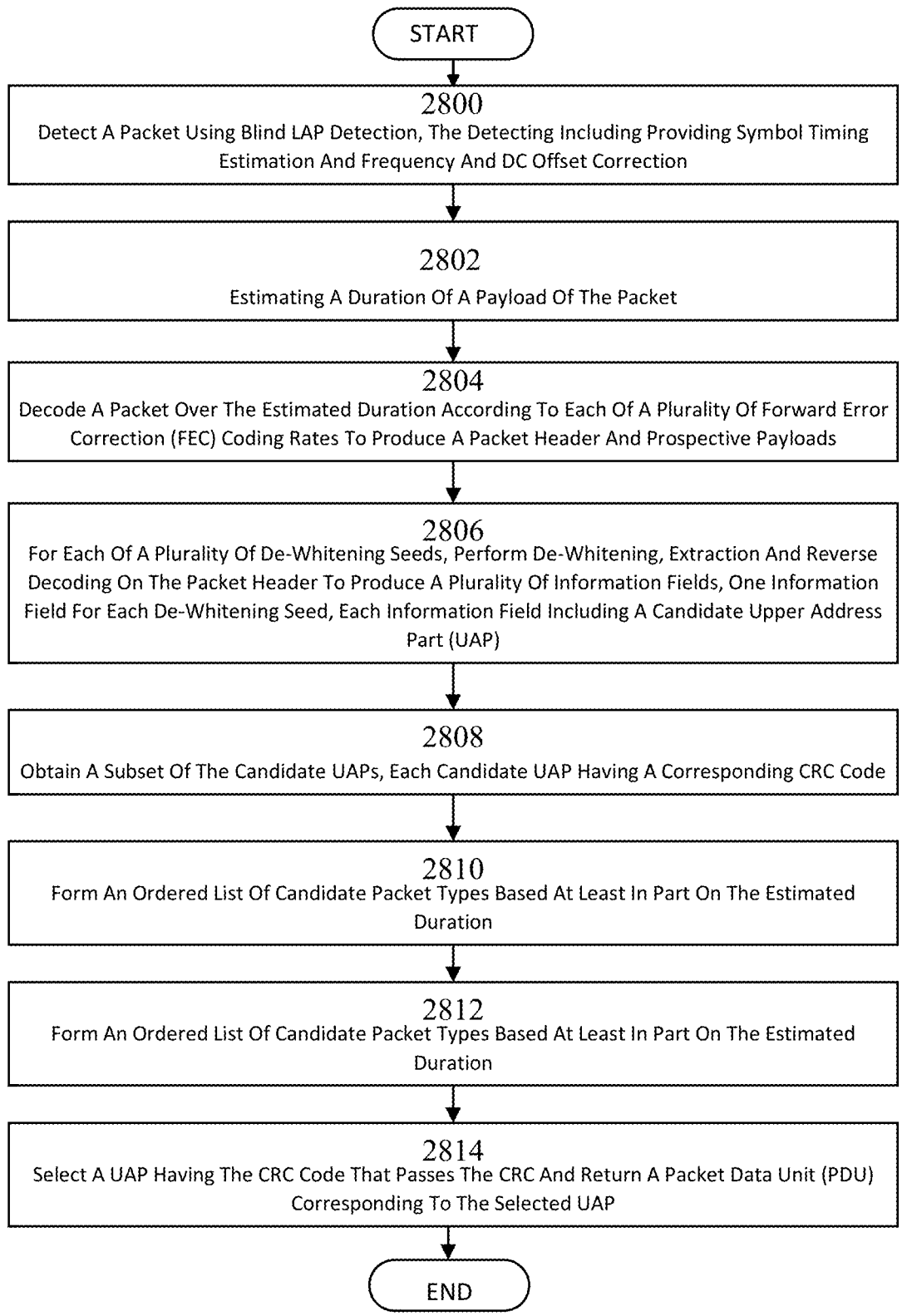
FIG. 28 is a flowchart of yet another alternative process for blind decoding of packets.

FIG. 28 is a flowchart of an alternative exemplary process for blind decoding of packets. The process includes detecting a packet using blind LAP detection, the detecting including providing symbol timing estimation and frequency and DC offset correction (step 2800). The process also includes estimating a duration of a payload of the packet (step 2802). The process further includes decoding a packet over the estimated duration according to each of a plurality of forward error correction (FEC) coding rates to produce a packet header and prospective payloads (step 2804). The process also includes, for each of a plurality of de-whitening seeds, performing de-whitening, extraction and reverse decoding on the packet header to produce a plurality of information fields, one information field for each de-whitening seed, each information field including a candidate upper address part (UAP) (step 2806). The process further includes obtaining a subset of the candidate UAPs, each candidate UAP having a corresponding CRC code (step 2808). The process also includes forming an ordered list of candidate packet types based at least in part on the estimated duration (step 2810). The process also includes performing a cyclic redundancy check (CRC) on the CRC code in each candidate UAP corresponding to a candidate packet type in the ordered list until a CRC code passes the CRC check (step 2812). The process further includes selecting a UAP having the CRC code that passes the CRC, and returning a packet data unit (PDU) corresponding to the selected UAP (step 2814).

In some embodiments, the blind LAP detection, payload duration estimation, and payload decoding is aided by collision detection. In some embodiments, estimating the payload duration is based at least in part on calculating a first estimate based on a comparison of a look-ahead maximum energy and a running average of received energy, and calculating a second estimate based on subtraction of a first symbol and a factor accounting for a ramp-down of a power amplifier. In some embodiments, the method further includes estimating a modulation index based at least in part on averaging deviations over the packet header, and calculating a signal to noise ratio for the packet header and for the payload of the packet. In some embodiments, the decoding includes classifying an FEC rate as one of 1, 1/3 and 2/3 based on a measured rate of zero syndrome occurrences. In some embodiments, the method further includes creating a table of de-whitening seeds, where for each de-whitening seed there is a corresponding reverse decoded UAP and a packet header type field (PHTF) in the table. In some embodiments, forming the ordered list of candidate packet types includes estimating a packet type based at least in part on packet length, signal to noise ratio (SNR), and elements of FEC rate estimate. In some embodiments the method includes performing a check for packet types based on the estimate, and sorting a remaining set of candidate packets based at least in part on whether modulation is Gaussian frequency shift keying (GFSK), and based at least in part on packet length estimate and estimated FEC rate. In some embodiments, the method further includes for packet types having one of a payload header and a fixed payload length, and for each de-whitening candidate: computing an expected CRC location and performing a CRC of the PDU based on the computed expected CRC location. For variable length packet types with a CRC code but no payload header some embodiments include computing a plurality of estimations of a CRC location based on an estimated payload duration, and performing a CRC for each de-whitening candidate and potential CRC location. In some embodiments, the method also includes, when a packet type has a CRC code, performing a CRC and when the CRC passes, de-whitening the packet using a seed established for the packet type, computing a PDU size based upon a position of the CRC code, and estimating an encryption type. In some embodiments, the method includes, when all seeds have been checked and no valid CRC is found, returning packet information.

Current and prior art comprises either a monitoring device listening in on a single channel or, in the case of a broadband packet analyzer requires up-front information to monitor the exchange of packets on a single piconet. Some embodiments allow in-parallel operation of the survey or monitoring of many piconets simultaneously. In-parallel operation allows independence from the respective piconets' spread spectrum hop sequencing and hence many piconets can be tracked simultaneously. Some embodiments enable the monitoring receiver to be able to listen to everything that is received at the antenna and process all of it in real-time using just one RF path.

The embodiment is described herein with reference to flowchart illustrations. It will be understood that each block of the flowchart illustrations can be implemented by computer program instructions. These computer program instructions may be provided to a processor of a general purpose computer (to thereby form a special purpose computer), special purpose computer, or other programmable data processing apparatus to produce a machine, such that the instructions, which execute via the processor of the computer or other programmable data processing apparatus, create means for implementing the functions/acts specified in the flowchart step or steps.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart step or steps.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart step or steps.

It is to be understood that the functions/acts noted in the steps may occur out of the order noted in the operational illustrations. For example, two steps shown in succession may in fact be executed substantially concurrently or the steps may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the details of the LD discriminator, the number of symbols used in the averaging and look ahead maximum calculation used in the packet length estimation, the threshold level and number of symbols used in the FEC rate classification, the ordering of the whitening seed and PHTF lists, the SNR thresholds used for the determination of GFSK and packet type selection, the allowable errors used in the estimated packet length and payload sizes. Accordingly, the scope should be determined not by the embodiments illustrated.

It will be appreciated by persons skilled in the art that the present embodiments are not limited to what has been particularly shown and described herein above. A variety of modifications and variations are possible in light of the above teachings without departing from the scope of the following claims.

What is claimed is:

1. A method of decoding packets in a receiver, the method comprising:
   detecting a packet using blind Lower Address Part (LAP) detection, the detecting including providing symbol timing estimation and frequency and offset correction;
   estimating a duration of a payload of the packet;
   decoding a packet over the estimated duration according to each of a plurality of forward error correction (FEC) coding rates to produce a packet header and prospective payloads, the decoding including classifying an FEC rate as one of 1, 1/3 and 2/3 based on a measured rate of zero syndrome occurrences, the classifying including:
      measuring the rate of zero syndrome occurrences observed over a corresponding number of codewords for each respective FEC rate;
      determining a zero syndrome occurrence for a 1/3 FEC rate when a given triplet has three identical binary values; and
      determining a zero syndrome occurrence for a 2/3 FEC rate when a given 15-bit codeword produces a zero result of a syndrome parity check matrix operation;
   for each of a plurality of de-whitening seeds, performing de-whitening, extraction and reverse decoding on the packet header to produce a plurality of information fields, one information field for each de-whitening seed, each information field including a candidate upper address part (UAP);
   obtaining a subset of the candidate UAPs, each candidate UAP having a corresponding cyclic redundancy check (CRC) code;
   forming an ordered list of candidate packet types based at least in part on the estimated duration;
   performing a cyclic redundancy check (CRC) on the CRC code in each candidate UAP corresponding to a candidate packet type in the ordered list until a CRC code passes the CRC check;
   selecting a UAP having the CRC code that passes the CRC; and
   returning a packet data unit (PDU) corresponding to the selected UAP.

2. The method of claim 1, wherein the blind LAP detection, payload duration estimation, and payload decoding is aided by collision detection.

3. The method of claim 1, wherein estimating the payload duration is based at least in part on:
   calculating a first estimate based on a comparison of a look-ahead maximum energy and a running average of received energy; and
   calculating a second estimate based on subtraction of a first symbol and a factor accounting for a ramp-down of a power amplifier.

4. The method of claim 1, further comprising:
   estimating a modulation index based at least in part on averaging deviations over the packet header; and
   calculating a signal to noise ratio for the packet header and for the payload of the packet.

5. The method of claim 1, wherein the classifying further includes one of:
   classifying the FEC rate as 1/3 when a corresponding zero-syndrome is above a first predetermined threshold;
   classifying the FEC rate as 2/3 when a corresponding zero-syndrome is above a second predetermined threshold; and
   classifying the FEC rate as 1 if the FEC rate is not classified as one of 1/3 and 2/3.

6. The method of claim 1, further comprising creating a table of de-whitening seeds, where for each de-whitening seed there is a corresponding reverse decoded UAP and a packet header type field (PHTF) in the table.

7. The method of claim 1, wherein forming the ordered list of candidate packet types comprises:
   estimating a packet type based at least in part on packet length, signal to noise ratio (SNR), and elements of FEC rate estimate;
   performing a check for packet types based on the estimate; and
   sorting a remaining set of candidate packets based at least in part on whether modulation is Gaussian frequency shift keying (GFSK), and based at least in part on packet length estimate and estimated FEC rate.

8. The method of claim 7, further comprising:
   for packet types having one of a payload header and a fixed payload length, and for each de-whitening candidate:
      computing an expected CRC location;
      performing a CRC of the PDU based on the computed expected CRC location; and
   for variable length packet types with a CRC code but no payload header:
      compute a plurality estimations of a CRC location based on an estimated payload duration; and
      perform a CRC for each de-whitening candidate and potential CRC location.

9. The method of claim 8, further comprising, when a packet type has a CRC code, performing a CRC and when the CRC passes:
   de-whitening the packet using a seed established for the packet type
   computing a PDU size based upon a position of the CRC code; and
   estimating an encryption type.

10. The method of claim 9, further comprising, when all seeds have been checked and no valid CRC is found, returning packet information.

11. A receiver for blind of decoding packets, the receiver comprising processing circuitry configured to:
   detect a packet using blind Lower Address Part (LAP) detection, the detecting including providing symbol timing estimation and frequency and offset correction;
   estimate a duration of a payload of the packet;
   decode a packet over the estimated duration according to each of a plurality of forward error correction (FEC) coding rates to produce a packet header and prospective payloads, the decoding including classifying an FEC rate as one of 1, 1/3 and 2/3 based on a measured rate of zero syndrome occurrences, the classifying including:
      measuring the rate of zero syndrome occurrences observed over a corresponding number of codewords for each respective FEC rate;
      determining a zero syndrome occurrence for a 1/3 FEC rate when a given triplet has three identical binary values; and
      determining a zero syndrome occurrence for a 2/3 FEC rate when a given 15-bit codeword produces a zero result of a syndrome parity check matrix operation;
   for each of a plurality of de-whitening seeds, perform de-whitening, extraction and reverse decoding on the packet header to produce a plurality of information fields, one information field for each de-whitening seed, each information field including a candidate upper address part (UAP);

obtain a subset of the candidate UAPs, each candidate UAP having a corresponding cyclic redundancy check (CRC) code;

form an ordered list of candidate packet types based at least in part on the estimated duration;

perform a cyclic redundancy check (CRC) on the CRC code in each candidate UAP corresponding to a candidate packet type in the ordered list until a CRC code passes the CRC check;

select a UAP having the CRC code that passes the CRC; and return a packet data unit (PDU) corresponding to the selected UAP.

12. The receiver of claim 11, wherein the blind LAP detection, payload duration estimation, and payload decoding is aided by collision detection.

13. The receiver of claim 11, wherein estimating the payload duration is based at least in part on:
calculating a first estimate based on a comparison of a look-ahead maximum energy and a running average of received energy; and
calculating a second estimate based on subtraction of a first symbol and a factor accounting for a ramp-down of a power amplifier.

14. The receiver of claim 11, wherein the processing circuitry is further configured to:
estimate a modulation index based at least in part on averaging deviations over the packet header; and
calculate a signal to noise ratio for the packet header and for the payload of the packet.

15. The receiver of claim 11, wherein the classifying further includes one of:
classifying the FEC rate as 1/3 when a corresponding zero-syndrome is above a first predetermined threshold;
classifying the FEC rate as 2/3 when a corresponding zero-syndrome is above a second predetermined threshold; and
classifying the FEC rate as 1 if the FEC rate is not classified as one of 1/3 and 2/3.

16. The receiver of claim 11, wherein the processing circuitry is further configured to create a table of de-whitening seeds, where for each de-whitening seed there is a corresponding reverse decoded UAP and a packet header type field (PHTF) in the table.

17. The receiver of claim 11, wherein forming the ordered list of candidate packet types comprises:
estimating a packet type based at least in part on packet length, signal to noise ratio (SNR), and elements of FEC rate estimate;
performing a check for packet types based on the estimate; and
sorting a remaining set of candidate packets based at least in part on whether modulation is Gaussian frequency shift keying (GFSK), and based at least in part on packet length estimate and estimated FEC rate.

18. The receiver of claim 17, wherein the processing circuitry is further configured to:
for packet types having one of a payload header and a fixed payload length, and for each de-whitening candidate:
compute an expected CRC location;
perform a CRC of the PDU based on the computed expected CRC location; and for variable length packet types with a CRC code but no payload header:
compute a plurality estimations of a CRC location based on an estimated payload duration; and
perform a CRC for each de-whitening candidate and potential CRC location.

19. The receiver of claim 18, wherein the processing circuitry is further configured to, when a packet type has a CRC code, perform a CRC and when the CRC passes:
de-whiten the packet using a seed established for the packet type
compute a PDU size based upon a position of the CRC code; and
estimate an encryption type.

20. The receiver of claim 19, wherein the processing circuitry is further configured to, when all seeds have been checked and no valid CRC is found, return packet information.

* * * * *